United States Patent
Yun et al.

(10) Patent No.: US 11,743,883 B2
(45) Date of Patent: *Aug. 29, 2023

(54) APPARATUS AND METHOD FOR TRANSMITTING/RECEIVING OF DATA IN A WIRELESS COMMUNICATION SYSTEM PROVIDING DIFFERENT SERVICES

(71) Applicant: Samsung Electronics Co., Ltd., Suwon-si (KR)

(72) Inventors: Yeohun Yun, Hwaseong-si (KR); Kyeongyeon Kim, Hwaseong-si (KR); Chanhong Kim, Suwon-si (KR); Jongbu Lim, Seoul (KR); Sungnam Hong, Suwon-si (KR); Taeyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 120 days.

This patent is subject to a terminal disclaimer.

(21) Appl. No.: 17/475,623

(22) Filed: Sep. 15, 2021

(65) Prior Publication Data

US 2022/0007383 A1     Jan. 6, 2022

Related U.S. Application Data

(63) Continuation of application No. 15/934,269, filed on Mar. 23, 2018, now Pat. No. 11,129,175.

(30) Foreign Application Priority Data

Mar. 23, 2017   (KR) ................. 10-2017-0037090

(51) Int. Cl.
*H04W 72/12*     (2023.01)
*H04W 72/0453*     (2023.01)
(Continued)

(52) U.S. Cl.
CPC ... *H04W 72/1215* (2013.01); *H04W 72/0446* (2013.01); *H04W 72/0453* (2013.01); *H04W 72/23* (2023.01)

(58) Field of Classification Search
CPC .......... H04W 72/042; H04W 72/0446; H04W 72/0453; H04W 72/1215; H04W 72/0406; H04W 72/1278
See application file for complete search history.

(56) References Cited

U.S. PATENT DOCUMENTS 8,027,637 B1   9/2011   Bims
2005/0036505 A1   2/2005   Frei et al.
(Continued)

FOREIGN PATENT DOCUMENTS

WO   2016-076107 A1   5/2016

OTHER PUBLICATIONS

A Decision to Grant a Patent dated Dec. 30, 2021, issued in a counterpart Korean Application No. 10-2017-0037090.
(Continued)

*Primary Examiner* — Zhensheng Zhang
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services.

12 Claims, 20 Drawing Sheets

(51) Int. Cl.
*H04W 72/0446* (2023.01)
*H04W 72/23* (2023.01)

(56) References Cited

U.S. PATENT DOCUMENTS

| | | |
|---|---|---|
| 2008/0107061 A1 | 5/2008 | Tao et al. |
| 2014/0241242 A1 | 8/2014 | Josiam et al. |
| 2014/0254545 A1 | 9/2014 | Novak et al. |
| 2015/0256308 A1 | 9/2015 | Ma et al. |
| 2015/0280871 A1 | 10/2015 | Xu et al. |
| 2017/0325243 A1 | 11/2017 | Yasukawa et al. |
| 2018/0063749 A1 | 3/2018 | Islam et al. |
| 2018/0262311 A1 | 9/2018 | Wang et al. |
| 2018/0309546 A1 | 10/2018 | Tang et al. |

OTHER PUBLICATIONS

Intel Corporation, NR HARQ and scheduling timing, 3GPP R1-1609542, Oct. 14, 2016, Lisbon, Portugal.

ZTE et al.; Way Forward on Puncturing Indication; 3GPP TSG-RAN WG1 #88; R1-1704034; Agenda item 8.1.3.4.1; Feb. 13-17, 2017; Athens, Greece.

ZTE et al.; Way Forward on Puncturing Indication; 3GPP TSG-RAN WG1 #88; R1-1704062; Agenda item 8.1.3.4.1; Feb. 13-17, 2017; Athens, Greece.

Interdigital Communications, 'Downlink scheduling using slots and mini-slots', R1-1612314, 3GPP TSG RAN WG1 Meeting #87, Reno, USA, Nov. 5, 2016, See pp. 1-3.

Intel Corporation, 'Slot and mini-slot multiplexing and alignment', R1-1611959, 3GPP TSG RAN WG1 Meeting #87, Reno, USA, Nov. 6, 2016, See pp. 1-3.

NEC, 'DCI monitoring configuration for mini-slot', R1-1701980, 3GPP TSG RAN WG1 Meeting #88, Athens, Greece, Feb. 6, 2017 See pp. 1-2.

Samsung, 'Remaining design aspects of mini-slot', R1-1703015, 3GPP TSG RAN WG1 Meeting #88, Athens, Greece, Feb. 7, 2017 See pp. 1-3.

Korean Office Action dated Jul. 20, 2021, issued in a counterpart Korean Application No. 10-2017-0037090.

Guangdong OPPO Mobile Telecom, R1-1701961, On multiplexing eMBB and URLLC in DL, 3GPP TSG RAN WG1 #88; Feb. 6, 2017, Athens, Greece.

Qualcomm Incorporated, R1-1702636, Multi-bit HARQ-ACK feedback, 3GPP TSG RAN WG1 #88; Feb. 7, 2017, Athens, Greece.

APPARATUS AND METHOD FOR TRANSMITTING/RECEIVING OF DATA IN A WIRELESS COMMUNICATION SYSTEM PROVIDING DIFFERENT SERVICES

CROSS-REFERENCE TO RELATED APPLICATION(S)

This application is a continuation application of prior application Ser. No. 15/934,269, filed on Mar. 23, 2018, which will be issued as U.S. Pat. No. 11,129,175 on Sep. 21, 2021, which is based on and claimed priority under 35 U.S.C. § 119(a) of a Korean patent application number 10-2017-0037090, filed on Mar. 23, 2017, in the Korean Intellectual Property Office, the disclosure of which is incorporated by reference herein in its entirety.

TECHNICAL FIELD

The disclosure relates to an apparatus and method for transmitting/receiving data in a wireless communication system. More particularly, the disclosure relates to a data transmission/reception apparatus and method for providing heterogeneous data services in the wireless communication system.

BACKGROUND

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System.' The 5G wireless communication system is considered to be implemented not only in lower frequency bands but also in higher frequency (mm Wave) bands, e.g. 10 GHz to 100 GHz bands, so as to accomplish higher data rates. To mitigate propagation loss of the radio waves and increase the transmission distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

The 5G systems will support more diverse services in comparison with the legacy 4G systems. Examples of representative services are enhanced mobile broadband (eMBB), ultra-reliable and low latency communication (URLLC), massive machine type communication (mMTC), and evolved multimedia broadcast/multicast service (eMBMS). Among these services, the URLLC service is newly considered for the 5G system, while is not being considered for 4G systems, and has requirements of ultra-reliability (e.g., packet error rate of about $10^{-5}$) and low latency (e.g., about 0.5 msec). In order to meet such demanding requirements, the URLLC service may be provided with a transmission time interval (TTI) shorter than that of the eMBB service in consideration of various operation schemes.

For example, a scenario where an eMBB service in a downlink network environment is scheduled and operated based on an eMBB TTI, and an URLLC service is scheduled and operated based on a TTI shorter than the eMBB TTI could be considered. In this scenario, the event that while the base station transmits eMBB service packets, the base station shall transmit URLLC packets could occur. If the base station shall transmit the URLLC packets while the base station transmits the eMBB service packets, the base station shall allocate some resources reserved for the eMBB service packets to provide the URLLC service instead of the eMBB service data due to the characteristics of the URLLC services. If the base station allocates some resources reserved for the eMBB service to provide the URLLC service instead of the eMBB service, a problem that a terminal provided with the eMBB services considers and processes the URLLC service data as the eMBB service data could occur. This problem cause serious deterioration in reception performance of the terminal provided with the eMBB services.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for mitigating performance degradation of a low priority service in a case of allocating part of resources reserved for the low priority service for the purpose of supporting a high priority service in a situation where heterogeneous services are provided in a wireless communication system.

Another aspect of the disclosure is to provide an efficient low priority service resource allocation information provision method of a transmitter or a base station in consideration of a capability of a receiver or a terminal.

In accordance with an aspect of the disclosure, a method of a base station is provided. The method includes generating a slot-based transmission signal including a mini-slot associated with a heterogeneous data services, transmitting the slot-based transmission signal to a terminal, and transmitting information indicating whether the slot-based transmission signal includes the mini-slot associated with a heterogeneous data service.

In accordance with another aspect of the disclosure, a method of a terminal is provided. The method includes receiving a slot-based transmission signal including a mini-slot associated with a heterogeneous data services, receiving information indicating whether the slot-based transmission signal includes the mini-slot associated with a heterogeneous data service, and decoding the slot-based transmission signal based on the information.

According to an embodiment of the present disclosure, it is possible to allocate resources for data transmission and indication information transmission efficiently when heterogeneous services having different characteristics are provided in wireless communication system. A terminal can recognize the resources allocated for each service. It is possible to achieve the great improvement in performance by applying efficient modulation and demodulation to low priority service losing some reserved resources for providing high priority service.

In addition, according to an embodiment of the present disclosure, it is possible to achieve the great improvement in reception efficiency of each service by combining indication information transmitted at multiple timings to configure indication information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1A:
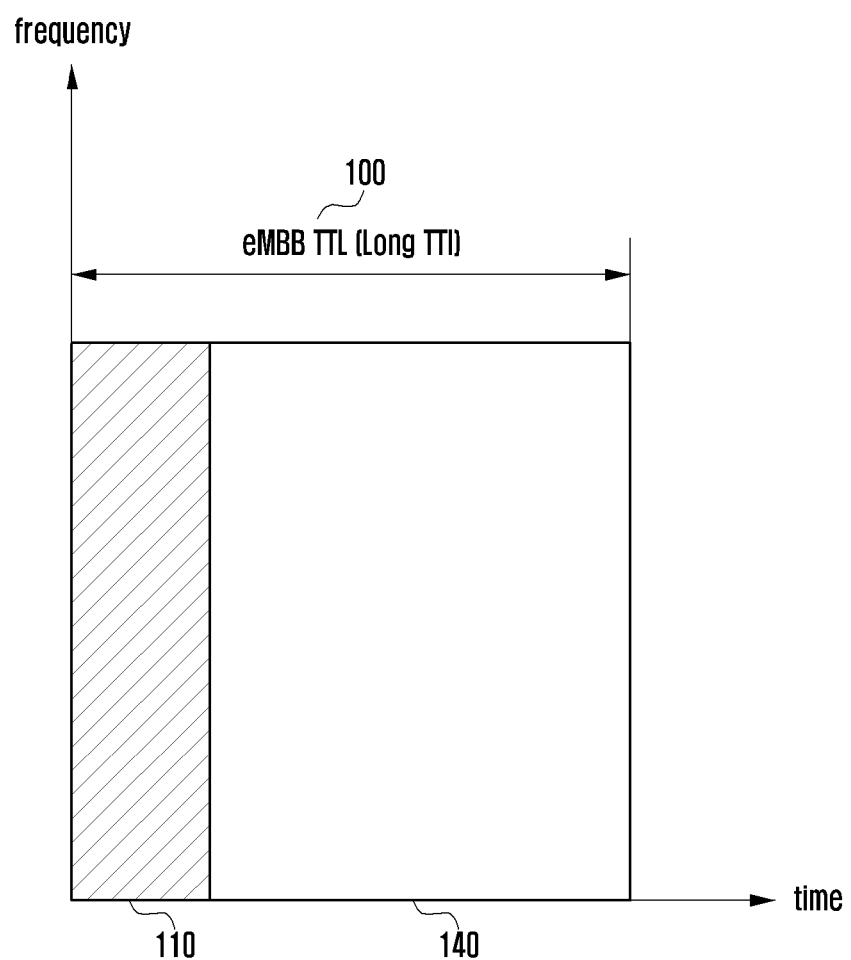
FIG. 1A is a diagram illustrating a resource allocation unit for slot-based services in a fifth generation (5G) wireless communication system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module," or the like, may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Before undertaking the detailed description of the disclosure below, it may be advantageous to make a brief description of a fifth generation (5G) or new radio (NR) wireless communication system. The 5G wireless communication system operates over broad bandwidth in comparison with the legacy $3^{rd}$ generation (3G) and $4^{th}$ generation (4G or long term evolution (LTE)/LTE-advanced (LTE-A)) wireless communication systems. Unlike the legacy 3G and 4G wireless communication standards developed in consideration of backward compatibility, the 5G wireless communication standards consider forward compatibility. In accordance with the standardization policy, the 5G wireless communication system specifies use cases of three service categories. The three service categories of the 5G wireless communication system are as follows:

The first service category is the enhanced mobile broadband (eMBB) service based on enhanced transmission speed, the second service category is the enhanced machine type communication (eMTC) service based on massive Internet of things (IoT) as a data communication service among things through wireless connections without any direct manipulation or involvement of human beings for information acquisition and transmission anytime anywhere, and the third service category is the ultra-reliable low latency communication (URLLC) service based on ultra-low latency and ultra-high reliability.

In the following description, the enhanced data rate-based data communication service as the first service category may be interchangeably referred to as "data communication," "data communication service," "eMBB," "eMBB service," and "eMBB communication service" with the same meaning for convenience of explanation.

The massive IoT-based communication service as the second service category may be interchangeably referred to as "IoT," "IoT service," "eMTC communication," "eMTC communication service," and "eMTC service" with the same meaning for convenience explanation.

The IoT communication service based on the ultra-low latency and ultra-high reliability as the third service category may be interchangeably referred to as "ultra-low latency service," "highly reliable service," "ultra-low latency communication," "highly reliable communication," "ultra-low latency highly reliable IoT communication," "ultra-low latency highly reliable IoT communication service," "URLLC," "URLLC communication," "URLLC service," and "URLLC communication service" with the same meaning for convenience of explanation.

In isolation from the viewpoint of service, communication signals may be categorized, from a structural view point, into one of two categories: slot transmission and mini-slot transmission, and the slot and mini-slot are distinguished by the number of symbols composing them. For example, a slot consists of 7 or 14 symbols, and a mini-slot consists of a certain number of symbols less than those of a slot. The concept of slot is used even in the legacy 4G communication systems, while the concept of mini-slot has been newly introduced to meet the diverse requirements of 5G communication systems. For example, use of the mini-slot may be considered in order to meet the requirement of a transmission unit composed of a small number of symbols, in comparison with the slot, for realizing the ultra-low delay service. The mini-slot may be used for other services including eMBB as well as the ultra-low delay service. Accordingly, the slot and mini-slot may coexist in the same service depending on the situation and may also be used for providing heterogeneous services.

For example, it may be possible to consider a slot transmission-based eMBB service and a mini-slot-based URLLC service. URLLC data is data requiring ultra-low latency and high reliability. Accordingly, if the URLLC data occur in a burst manner, the base station has to transmit the URLLC data immediately. In this respect, it is necessary to allocate resources in unit of a very short transmission time interval (TTI), as exemplified in FIG. 1B, and transmit to the terminal the URLLC data immediately upon its occurrence. Since the URLLC data should be transmitted at a short TTI, it may occur that all of the available frequency resources, e.g., frequency resources for transmitting the URLLC data, are already allocated to other terminals. In this case, it may be preferable for the URLLC service to have a priority higher than that of the eMBB service. Accordingly, the base station may allocate part of the resources reserved for the eMBB service as the resources for URLLC service to transmit the URLLC data.

Figure 1B:
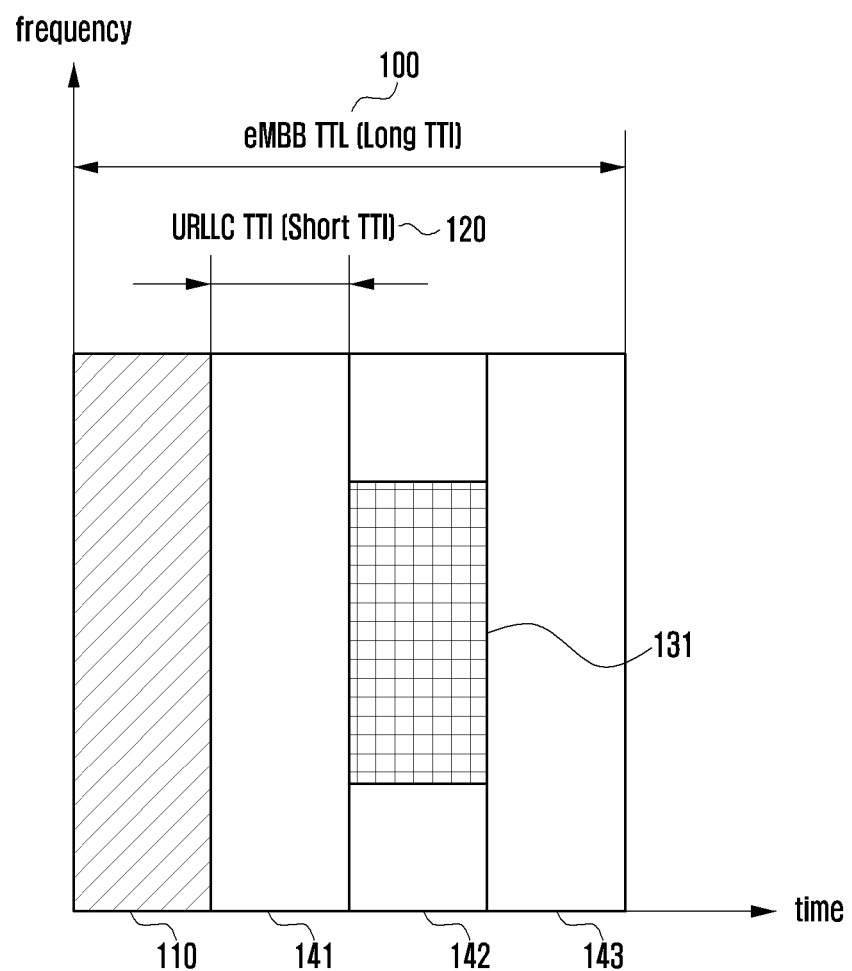
FIG. 1B is a diagram for explaining resource allocation for mini-slot-based services in resource regions allocated for slot-based services according to an embodiment of the disclosure.

FIG. 1A exemplifies resources allocation in a slot transmission scheme. FIG. 1B exemplifies a case of allocating part of the resources reserved for slot transmission to a specific terminal for mini-slot transmission. That is, if it is necessary to use a part of the slot resource allocated to a specific terminal receiving the slot-based service data, this means that a slot data region of slot resource has been filled with slot data to be transmitted to the corresponding terminal. In this case, a base station may puncture (or remove) part of the slot data mapped to the slot data region and insert mini-slot data 131 to the portion from which the slot data has been punctured. In the case where the base station punctures (or removes) part of the slot data mapped to the slot data region and fills the punctured portion with the mini-slot data 131, the terminal receiving the slot service may receive its desired slot-based service data including data mini-slot-based service destined for any other terminal.

If the terminal receiving the slot-based service (e.g., eMBB) receives its desired data including mini-slot-based service data (e.g., URLLC data) destined for any other terminal in a long TTI 100 allocated for the slot-based service, it performs demodulation and decoding on the slot-based service data including the mini-slot-based service data, resulting in significant data reception error. If the terminal fails to demodulate and decode data, it requests to the base station for retransmission. In the case of using a hybrid automatic repeat request (HARQ) scheme for combining the received data, the terminal is likely to consider the mini-slot-based service data as its desired slot-based service data and perform decoding on the slot-based service data including the mini-slot-based service data destined for any other terminal and thus request for retransmission more frequently than a normal case. As a consequence, the unintended retransmission requests caused by the mini-slot-based service data being transmitted in a burst manner results in unnecessary power waste of the terminal as well as bandwidth waste.

In the following description, the disclosure proposes an apparatus and method of a terminal that is capable of detecting mini-slot-based service data transmitted using part of the resources allocated for a slot-based service as shown in FIG. 1B. That is, the disclosure provides an apparatus and method for notifying a terminal receiving a first service of the presence of second service data transmitted at part of the resources allocated for the first service in a system supporting heterogeneous services. Also, the disclosure provides an apparatus and method for improving received data processing efficiency of a terminal based on indication information transmitted by the base station.

In the following description, the disclosure also proposes various schemes for use of the indication information and various formats of the indication information. In the following description, the disclosure also proposes methods for use by a receiver.

A description is made of the resources for providing slot-based and mini-slot-based services with reference to FIGS. 1A and 1B.

FIG. 1A is a diagram illustrating a resource allocation unit for slot-based services in a 5G wireless communication system according to an embodiment of the disclosure.

FIG. 1B is a diagram for explaining resource allocation for mini-slot-based services in resource regions allocated for slot-based services according to an embodiment of the disclosure.

Referring to FIG. 1A, the horizontal axis denotes time, and the vertical axis denotes frequency. In a wireless communication system, the resource allocation is performed in unit of frequency and time resource. In FIG. 1A, it is assumed that a frequency resource unit is defined by a predetermined frequency band or a predetermined number of frequency resources. Here, the time resource may be allocated in the same form or different forms for the respective services in a 5G wireless communication system. FIG. 1A exemplifies a case of allocating time resources for a slot-based service. For the slot-based service, a long TTI 100 is used as the resource allocation unit. The long TTI 100 being allocated for the slot-based service may include a period for transmitting a slot-based service control channel and a period for transmitting slot-based service data.

FIG. 1B is a diagram for explaining the resources allocated for the slot-based and mini-slot-based services.

Referring to FIG. 1B, a comparison is made between the slot-based and mini-slot-based services. As assumed above, it is assumed that a frequency resource unit is defined by a predetermined frequency band or a predetermined number of frequency resources. As described above, the long TTI 100 is used as the resource allocation unit for the slot-based service and may include the period for transmitting the slot-based service control channel conveying control information and the period for transmitting the slot-based service data. For the mini-slot-based service, it may be possible to allocate resources in units of a short TTI 120 rather than the long TTI 100. The period for transmitting the slot-based service data channel may include two or more short TTIs. FIG. 1B exemplifies a case where the period consists of three short TTIs 141, 142, and 143. However, the data transmission period of the long TTI 100 may be configured to include more than or less than three short TTIs as exemplified in FIG. 1B.

Hereinafter, the respective services are described on the basis of the explanation made with reference to FIGS. 1A and 1B. As described above, the wireless communication system may allocate resources in units of the long TTI 100 for providing a terminal with the slot-based service. As described with reference to FIG. 1A, the long TTI 100 may be composed of a slot-based service control channel 110 for conveying the control information and a slot-based service data channel 140 for conveying slot-based service data. The base station may transmit, on the slot-based service control channel 110, the control information for use by the terminal in receiving the slot-based service data 140. Accordingly, the slot-based service-receiving terminal may receive the control information on the slot-based service control channel 110 and perform demodulation and decoding on the slot-based service data channel 140 based on the control information conveyed in the slot-based service control channel 110.

Meanwhile, the mini-slot-based service data is data requiring ultra-low latency and high reliability. Accordingly, if the mini-slot-based service data occur in a burst manner, the base station has to transmit the mini-slot-based service data immediately. In this respect, it is necessary to allocate resources in units of a very short TTI as exemplified in FIG. 1B and transmit to the terminal the minislot-based service data immediately upon its occurrence. Since the mini-slot-based service data should be transmitted at the short TTI, it may occur that all of the available frequency resources, e.g., frequency resources for transmitting the mini-slot-based service data, are already allocated to other terminals. In this case, it may be preferable for the mini-slot-based service to have a priority higher than that of the slot-based service. Accordingly, the base station has to allocate a portion of the resources reserved for the slot-based service as the resources for the mini-slot-based service to transmit the mini-slot-based service data.

FIG. 1B exemplifies a case where part of the slot-based service resource allocated to a certain terminal is re-allocated as the resource for transmitting the mini-slot-based service data. That is, in the case of using a part of the eMBB resource 100 for transmitting the mini-slot-based service data, the slot-based service data to be transmitted to the terminal may also be mapped to the slot-based service data region 140. Accordingly, the base station may puncture or remove the slot-based service data mapped to the resource to be re-allocated for mini-slot-based service data transmission in the slot-based service data region 140 and insert (map) the mini-slot-based service data 131 to be transmitted to the terminal to the resource where the slot-based service data has been punctured or removed. In the case where the base station punctures or removes the data mapped to part of the slot-based service data region 140 and inserts the mini-slot-based service data 131 to the corresponding resource where the slot-based service data has been punctured or removed, the slot-based service terminal may receive unintended data as well as the target data in the resource region allocated to the terminal.

If the slot-based service-receiving terminal receives the mini-slot-based service data destined for any other terminal during the long TTI 100 allocated to the slot-based service-receiving terminal, the slot-based service-receiving terminal performs demodulation and decoding on the data including the mini-slot-based service data that is not destined for the slot-based service-receiving terminal, resulting in significant data reception error. In this case, the slot-based service-receiving terminal may request to the base station for retransmission of the unsuccessfully demodulated and decoded data. In the case of using a HARQ scheme for combining the received data, the terminal is likely to consider the mini-slot-based service data as its desired slot-based service data and perform decoding on the slot-based service data including the mini-slot-based service data destined for any other terminal and thus request for retransmission more frequently than a normal case. As a consequence, the unintended retransmission requests caused by the mini-slot-based service data result in unnecessary power waste of the terminal as well as bandwidth waste.

In order to solve the above problems, it may be possible to consider a method for the base station to notify the terminal of the presence/absence of mini-slot service data in the previous or current transmission signal and, if present, position of the mini-slot service data using the slot-based service control channel. This method is capable of improving reception performance of the terminal considerably by using the information received through the control channel in comparison with the legacy method.

Figure 2:
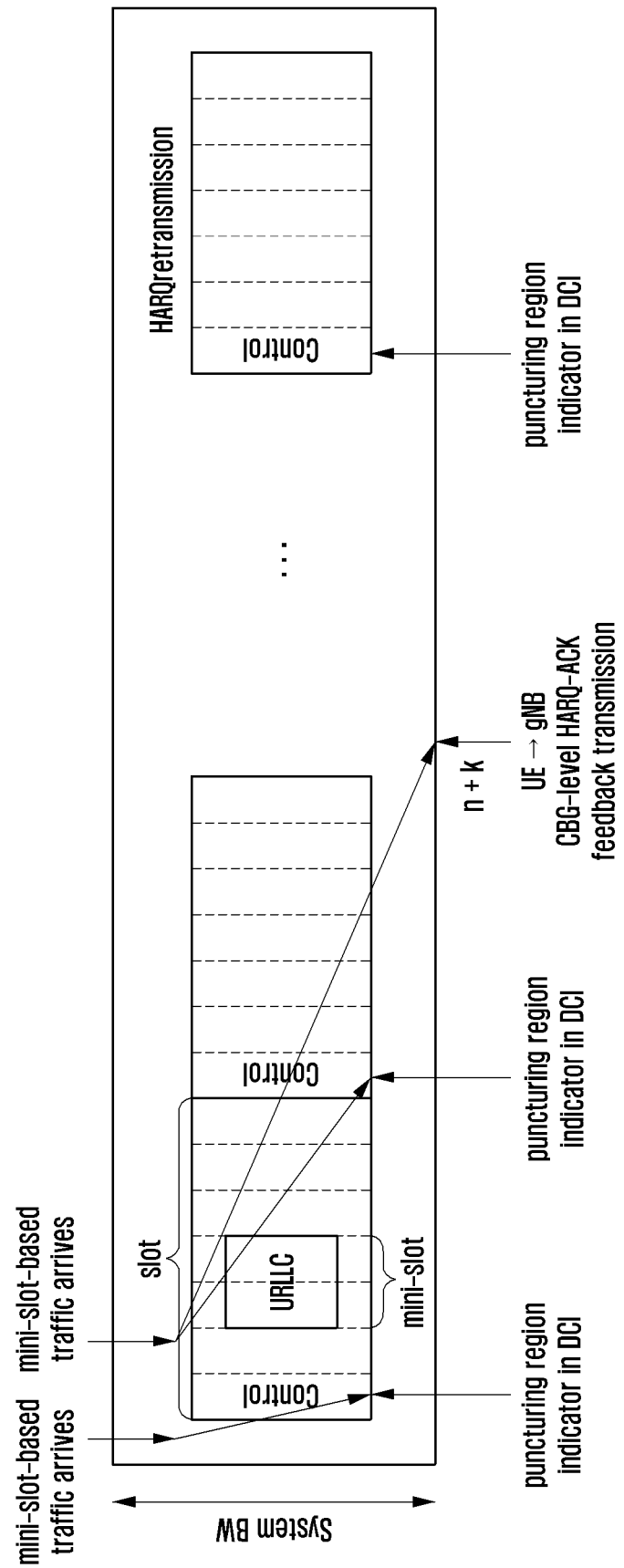
FIG. 2 is a diagram according to an embodiment of the disclosure.

FIG. 2 is a diagram according to an embodiment of the disclosure.

Referring to FIG. 2, the aforementioned methods are described in detail hereinafter. An indicator indicating a region of mini-slot-based service data in the previous or current slot may be transmitted at one of three different control channel timings according to a mini-slot-based service data occurrence timing, as shown in FIG. 2. The information on the region of the mini-slot-based service data may be equal in size to or greater than a region occupied by mini-slots in a real slot. The three control channel timings are described hereinbelow.

1) In the case where the mini-slot-based service data of which occurrence timing falls before the current slot is transmitted in the current slot by puncturing a portion of slot-based service data in the current slot allocated for transmitting slot-based service data and filling the punctured portion with the mini-slot-based service data, the information on the region of the mini-slots located in the current slot is transmitted to the terminal through the control channel of the current slot (first indicator of FIG. 1B is the case of the above example).

2) In the case where the mini-slot-based service data of which occurrence timing falls in the current slot is transmitted in the current slot, the information on the region of the mini-slots located in the current slot is transmitted to the terminal through the control channel of a predetermined slot before the terminal transmits an HARQ-ACK after the current slot (second indicator of FIG. 1B is the case of the above example).

3) In the case where the mini-slot-based service data of which occurrence timing falls in the current slot is transmitted in the current slot, the information on the region of the mini-slots located in the current slot is transmitted to the terminal through the control channel at the HARQ retransmission timing of the corresponding slot (third indicator of FIG. 1B is the case of the above example).

Descriptions are made of the methods for configuring the puncturing region indicator in the control channel being transmitted at the control channel timings 1) and 2) among the three control channel timings. The disclosure proposes a method for designing a puncturing region indicator with a fixed bitwidth. The puncturing region indicator with a fixed bitwidth may be interpreted by a different unit of measure.

Figure 3A:
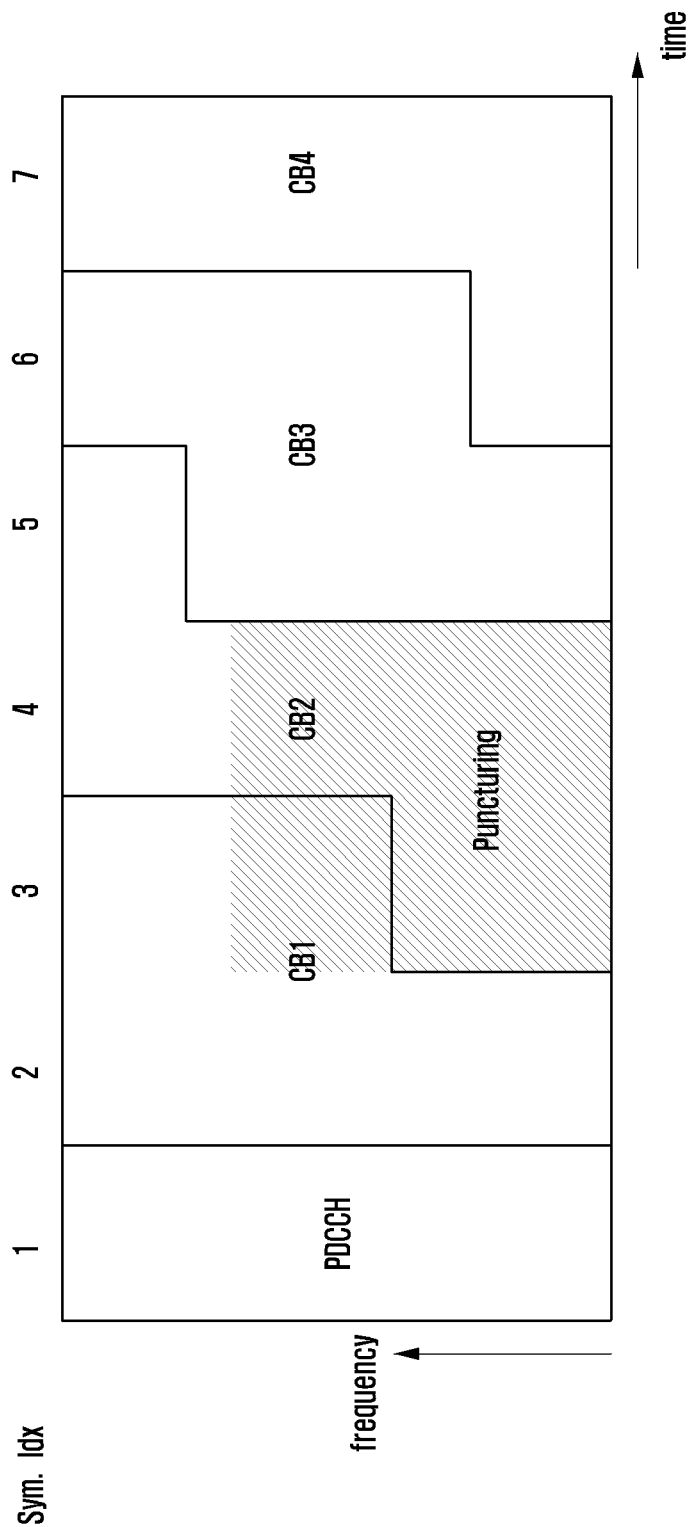
FIGS. 3A and 3B shows a case where a transport block (TB) is segmented into 4 code blocks (CBs) in a slot according to various embodiments of the disclosure.
Figure 3B:
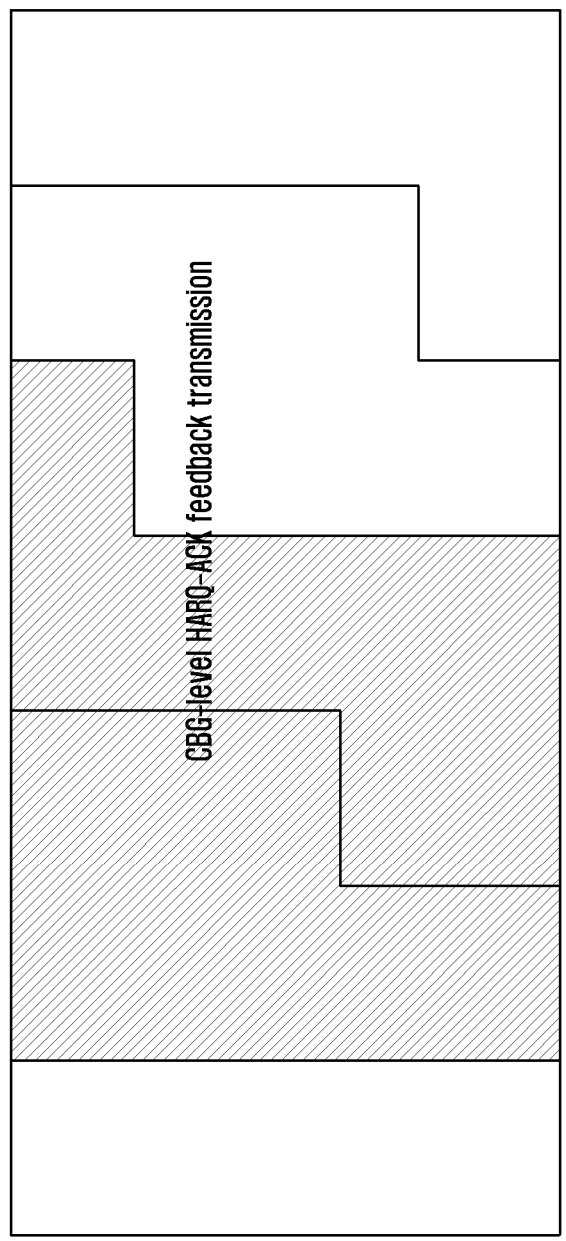

FIGS. 3A and 3B show a case where a transport block (TB) is segmented into 4 code blocks (CBs) in a slot according to various embodiments of the disclosure.

Figure 4A:
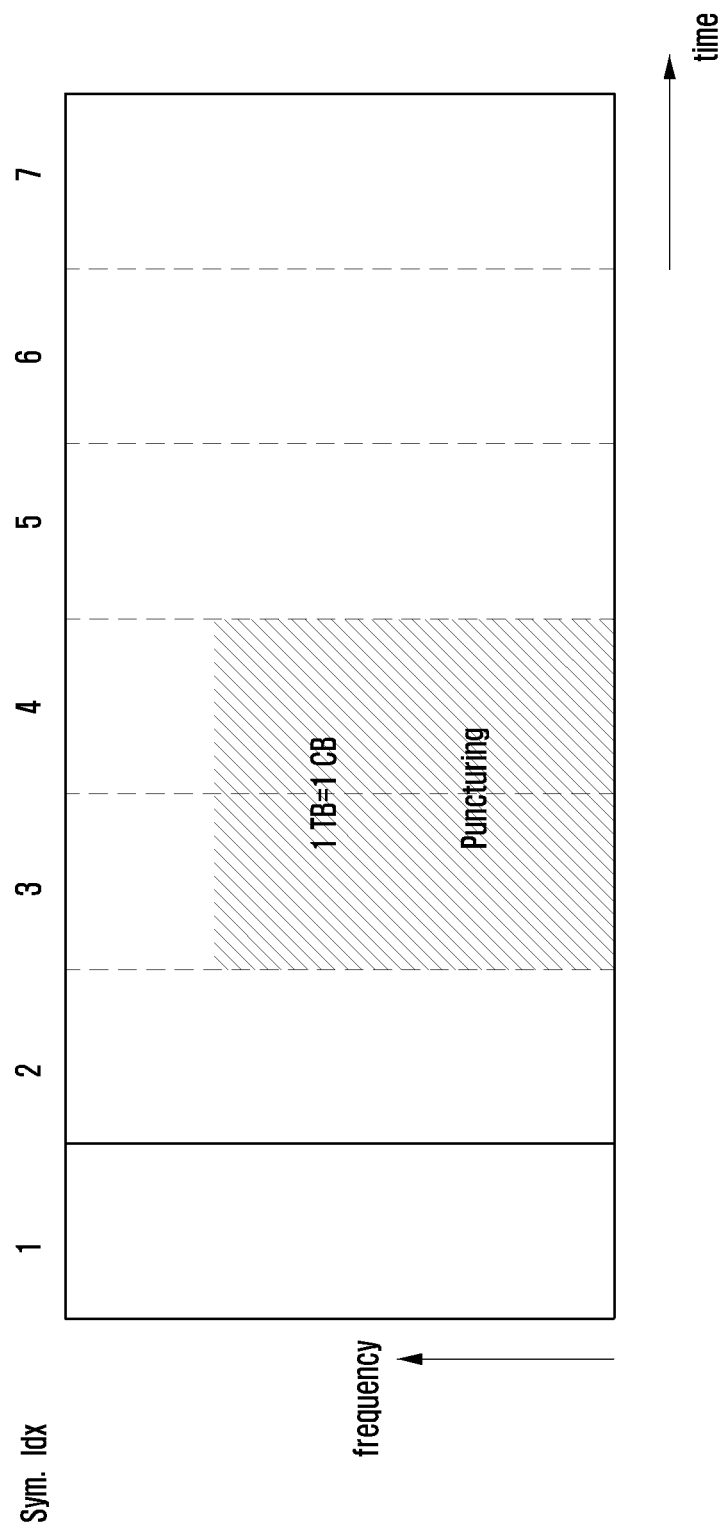
FIG. 4A exemplifies a case where a TB is composed of one CB according to an embodiment of the disclosure.

FIG. 4A exemplifies a case where a TB is composed of one CB according to an embodiment of the disclosure.

Referring to FIGS. 3A and 3B, assuming that the puncturing region indicator has a bitwidth of 4 bits, it may be possible, in the embodiment of FIGS. 3A and 3B, to indicate the puncturing region for mini-slot-based service data in the CBs using a bitmap of 4 bits because the number of CBs is identical with the bitwidth of the puncturing region indicator. If the 4-bit bitmap is used in the embodiment of FIG. 3A, the puncturing region indicator may be set to 1100. FIG. 3B shows the puncturing region information in view of the terminal that has received the puncturing region indicator. The terminal can be aware of the puncturing region in the form as depicted in FIG. 3B based on the puncturing region indicator.

Referring to FIG. 4A, in the case where a TB is composed of one CB, as shown in FIG. 4A, however, it is inefficient to use 1 bit of the 4-bit bitmap for indicating whether puncturing has been made in the CB because the remaining 3 bits become useless. In this case, it may be more useful to informatize the symbols composing the slot. In order to apply this to the case of FIG. 4A, it may be possible to sort some of symbols 2, 3, 4, 5, 6, and 7 into sets to generate 4 groups of (2, 3), (4, 5), 6, and 7 that are indicated by the 4-bit bit map. With this method, the puncturing region indicator is set to 1100 for the case of FIG. 4A.

Figure 4B:
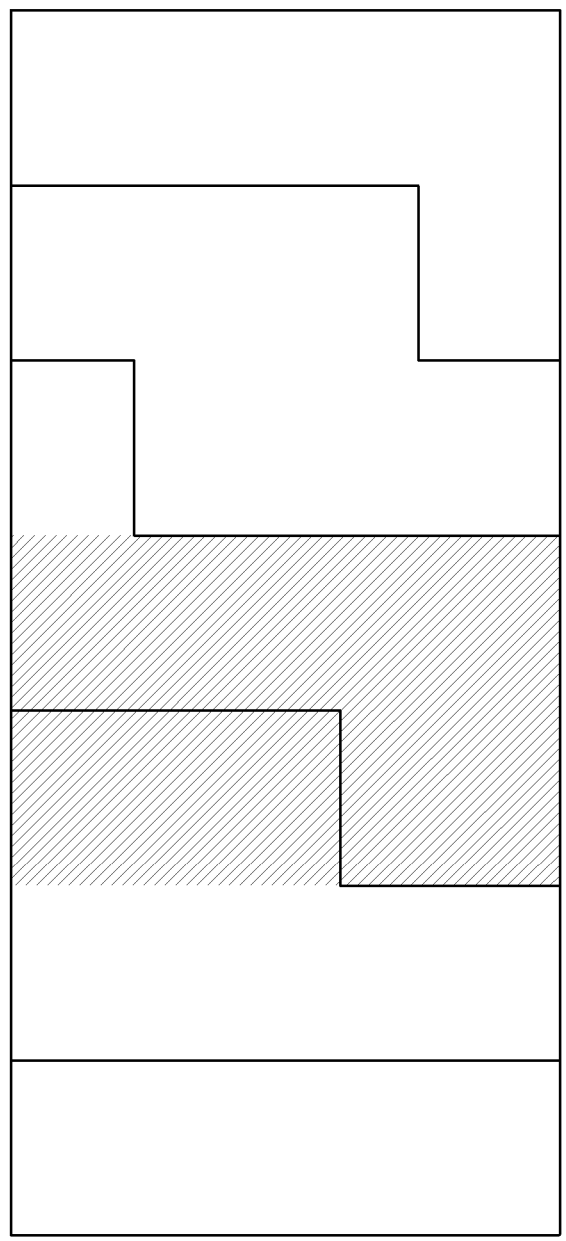
FIG. 4B depicts the puncturing region in view of the terminal that has received the puncturing region indicator according to an embodiment of the disclosure.

FIG. 4B depicts the puncturing region in view of the terminal that has received the puncturing region indicator according to an embodiment of the disclosure. Referring to FIG. 4B, the terminal is capable of being aware of the puncturing region in the form of FIG. 4B based on the puncturing region indicator.

On the basis of the above description, the puncturing region indicator may be configured according to the number of CBs composing a TB as follows.

Bitwidth of indicator=N
Number of CBs per TB=K

In the case where the bitwidth of the puncturing region indicator is less than the number of CBs constituting one TB, as in the case of FIG. 3A, the CB indices corresponding to the individual bits of the puncturing region indicator may be configured as follows:

If N<=K,
Small size of CB group (CBGs)=floor(K/N)
Large size of CB group (CBGb)=ceil(K/N)
if CBGb=CBGs,
CB index represented by $i^{th}$ bit of puncturing region indicator=(i−1)·CBGs+1:i·CBGs
    If (Option1-1) CBGb>CBGs,
determine Ns and Nb=N−Ns satisfying Ns·CBGs+(N−Ns)·CBGb=K.
    i.e., determine Ns=(K−N·CBGb)/(CBGs−CBGb) and Nb=N−(K−N·CBGb)/(CBGs−CBGb).
    CB index corresponding to $i^{th}$ bit of puncturing region indicator
    If i<=Ns,
    CB index=(i−1)·CBGs+1:i·CBGs
    If i>Ns,
    CB index=(i−Ns−1)·CBGb+1+Ns·CBGs:(i−Ns)·CBGb+Ns·CBGs
    If CBGb>CBGs (Option1-2),
Determine Ns and Nb=N−Ns satisfying Ns·CBGs+(N−Ns)·CBGb=K.
    That is, determine Ns=(K−N·CBGb)/(CBGs−CBGb) and Nb=N−(K−N·CB Gb)/(CBGs−CBGb).
CB index corresponding to $i^{th}$ bit of puncturing region indicator
    If i<=Nb,
    CB index=(i−1)·CBGb+1:i·CBGb
    If i>Ns, CB index=(i−Nb−1)·CBGs+1+Nb·CBGb:(i−Nb)·CBGs+Nb·CBGb Suppose that the puncturing region indicator has a bitwidth of 4 bits as an example of option 1 and option 2 and one TB consists of 6 CBs. In this case, the 6 code blocks are grouped into 1, 2, (3,4), and (5, 6) by applying option 1 and into (1,2) (3,4), 5, and 6 by applying option 2. Then, it is possible to configure the puncturing region indicator in the form of a bitmap of 4 bits representing 4 CB groups. For example, if the CBs 3 and 5 are each partially punctured, the puncturing region indicator with the bitwidth of 4 bits is set to 0011 in option 1 and 0110 in option 2.

In the case where the bitwidth of the puncturing region indicator is greater than the number of CBs constituting one TB, as in the case of FIG. 4A, the number of symbols available for transmitting mini-slot-based service data with the exception of the symbols unavailable for transmitting mini-slot-based service data, e.g., symbols carrying the control channel, is determined as follows:

If N>K, (if K'<N, only K' bits are used among N bits, and value N is replaced by value K' hereinbelow. The remaining bits N−K' are reserved bits for use in indicating PRB-level granularity.)
Number of symbols available for transmitting mini-slot-based service data with the exception of the symbols carrying the control channel and unavailable for transmitting mini-slot-based service data (number of available mini-slots)=K'

Here, it is assumed that the indices of available symbols (or available mini-slots) are mapped to logical indices regardless of the original symbol (or mini-slot) indices. For example, if the available symbol (or mini-slot) indices are 2, 3, and 6, the symbol (or mini-slot) indices 2, 3, and 6 are mapped to logical indices 1, 2, and 3, respectively. Then, it is possible to configure the puncturing region indicator with a bitwidth of 4 bits representing the respective CBs.

Small size of symbol (or mini-slot) group (SGs)=floor(K'/N)
Large size of symbol (or mini-slot) group (SGb)=ceil(K'/N)
If SGb=SGs,
Symbol (or mini-slot) index corresponding to $i^{th}$ bit of puncturing region indicator=(i−1)·SGs+1:i·SGs
    If (Option2-1) SGb>SGs,
determine Ns and Nb=N−Ns satisfying Ns·SGs+(N−Ns)·SGb=K'.
    i.e., determine Ns=(K'−N·SGb)/(SGs−SGb) and Nb=N−(K'−N·SGb)/(SGs−SGb).
Symbol (or mini-slot) index corresponding to $i^{th}$ bit of puncturing region indicator
    if i<=Ns,
    symbol (or mini-slot) index=(i−1)·SGs+1: i·SGs
    if i>Ns,
    symbol (or mini-slot) index=(i−Ns−1)·SGb+1+Ns·SGs: (1−Ns)·SGb+Ns·SGs FIG. 5A is a flowchart illustrating an operation of a base station in a system using the control channel timings of 1) and 2) according to an embodiment of the disclosure.

Figure 5A:
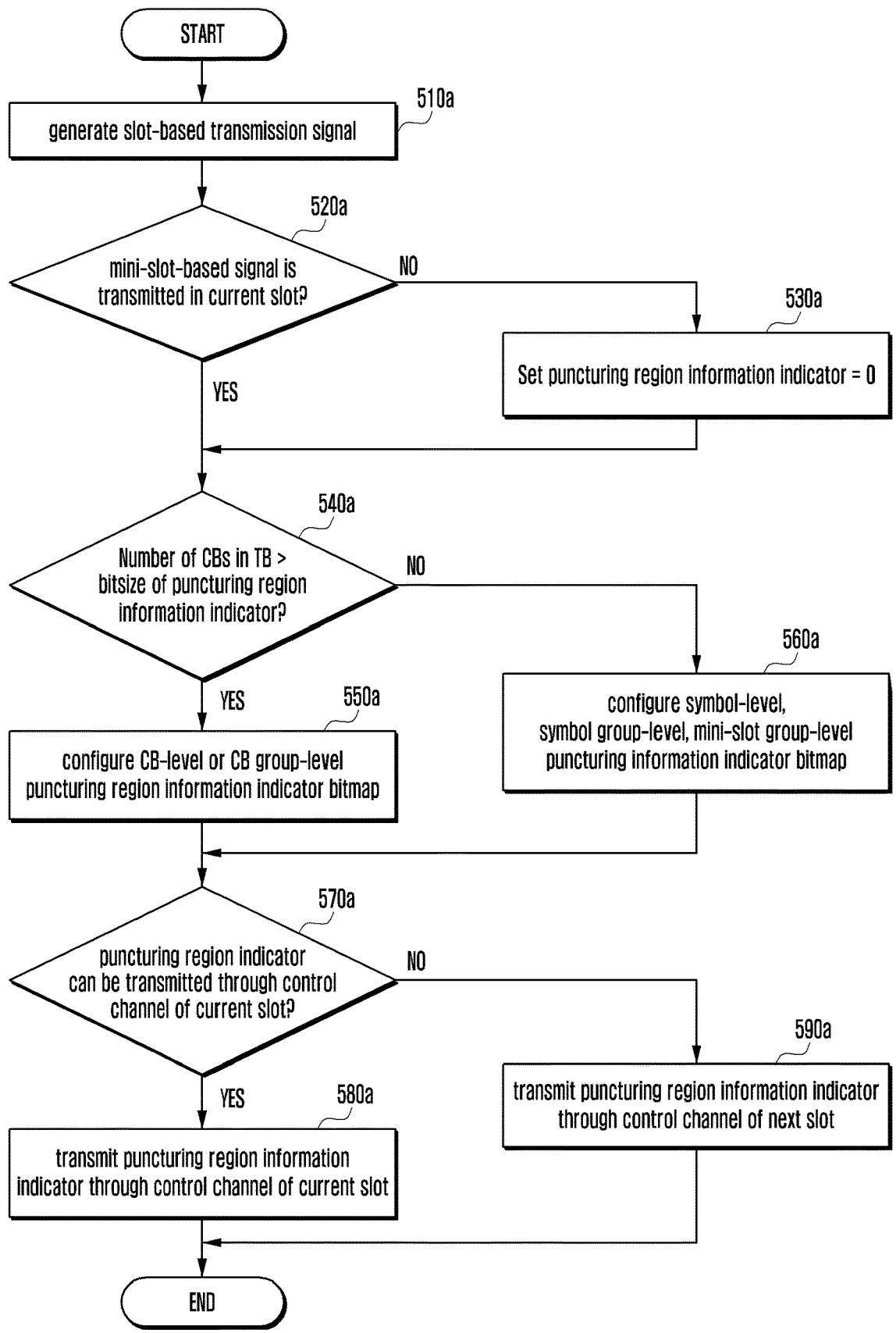
FIG. 5A is a flowchart illustrating an operation of a base station in a system using the control channel timings of 1) and 2) according to an embodiment of the disclosure.
Figure 5B:
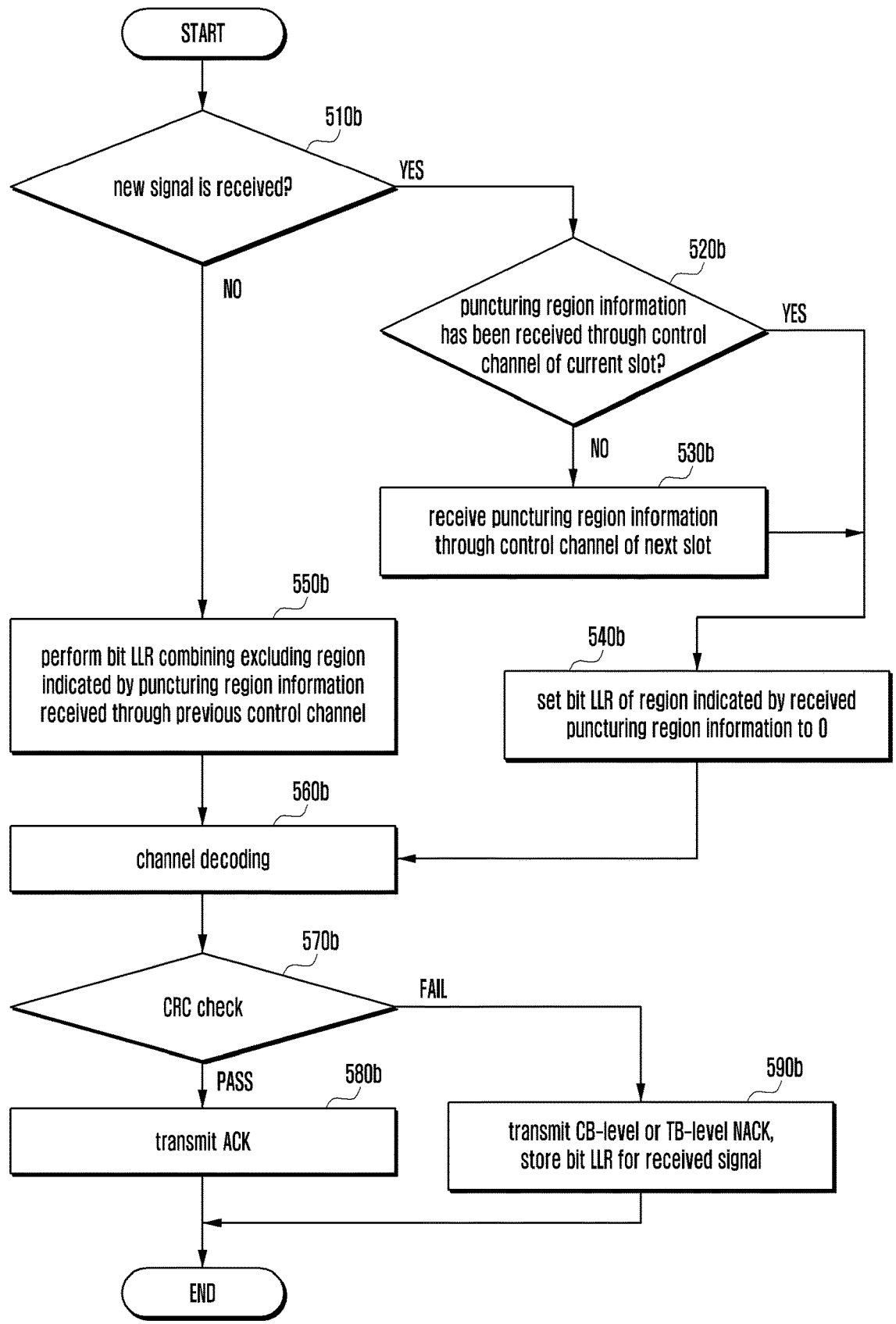
FIGS. 5B and 5C are flowcharts illustrating operations of a terminal in a system using the control channel timings of 1) and 2) according to various embodiments of the disclosure.
Figure 5C:
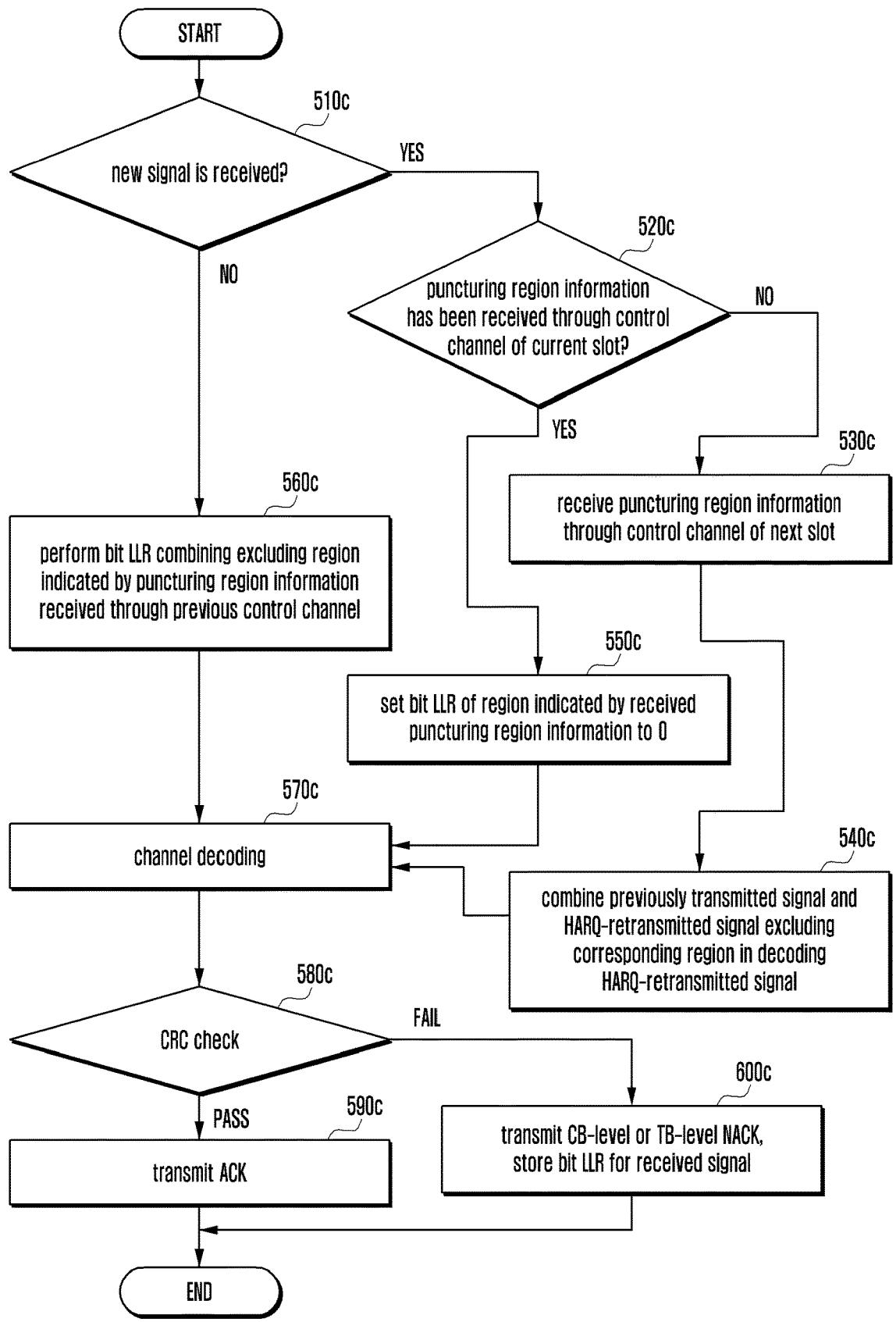

FIGS. 5B and 5C are flowcharts illustrating operations of a terminal in a system using the control channel timings of 1) and 2) according to various embodiments of the disclosure. As described above, the puncturing region indicator may be transmitted through the current control channel or not depending on the mini-slot-based traffic occurrence timing.

Referring to FIG. 5A, the base station generates a slot-based transmission signal operation 510a. The base station determines whether a mini-slot-based signal is transmitted in the current slot at operation 520a. If any mini-slot-based signal is not transmitted in the current slot, a puncturing region information indicator is set to 0 at operation 530a. The base station determines whether the number of CBs in TB is greater than the bit size of a puncturing region information indicator at operation 540a. If the number of CBs in TB is greater than the bit size of the puncturing region information indicator, the base station configures a CB-level or CB group-level puncturing region information indicator bitmap at operation 550a. Otherwise, the base station configures a symbol-level, symbol group-level, or mini-slot group-level puncturing information indicator bitmap at operation 560a. The base station determines whether the puncturing region indicator can be transmitted through the control channel of the current slot at operation 570a. If the puncturing region indicator can be transmitted through the control channel of the current slot, the base station transmits the puncturing region information indicator through the control channel of the current slot at operation 580a. Otherwise, the base station transmits puncturing region information indicator through control channel of next slot.

Referring to FIG. 5B, the terminal determines whether a new signal is received at operation 510b. When the new signal is received, the terminal determines whether puncturing region information has been received through the control channel of the current slot at operation 520b. If the puncturing region information has not been received through the control channel of the current slot, the terminal receives the puncturing region information through the control channel of the next slot at operation 530b. The terminal receiving the puncturing region information sets bit LLR of the region indicated by the received puncturing region information to 0 at operation 540b. If the new signal is not received, e.g., the HARQ-retransmitted signal is received, the terminal performs bit LLR combining excluding the region indicated by the puncturing region information received through previous control channel at operation 550b. The terminal performs a channel decoding at operation 560b and a CRC check at operation 570b. The terminal transmits ACK at operation 580b, or transmits CB-level or TB-level NACK at operation 590b according to the result of the CRC check. In addition, if the terminal fails in the CRC check, the terminal stores bit LLR for the received signal at operation 590b.

Referring to FIG. 5C, the terminal determines whether a new signal is received at operation 510c. When the new signal is received, the terminal determines whether puncturing region information has been received through the control channel of the current slot at operation 520c. If the puncturing region information has not been received through the control channel of the current slot, the terminal receives the puncturing region information through the control channel of the next slot at operation 530c, and combines the previously transmitted signal and the HARQ-retransmitted signal excluding corresponding region in decoding HARQ-retransmitted signal at operation 540c. If the puncturing region information has been received through the control channel of the current slot, the terminal sets bit LLR of the region indicated by the received puncturing region information to 0 at operation 550c. If the new signal is not received, e.g., the HARQ-retransmitted signal is received, the terminal performs bit LLR combining excluding the region indicated by the puncturing region information received through previous control channel at operation 560c. The terminal performs a channel decoding at operation 570c and a CRC check at operation 580c. The terminal transmits ACK at operation 590c, or transmits CB-level or TB-level NACK at operation 600c according to the result of the CRC check. In addition, if the terminal fails in the CRC check, the terminal stores bit LLR for the received signal at operation 600c.

Accordingly, if the mini-slot-based service data is transmitted in the current slot, the base station may determine whether the puncturing region indicator can be transmitted in the control channel of the current slot and, according to the determination result, transmit the puncturing region indicator through the control channel of the current slot or the next slot. FIG. 5B shows an operation of the terminal in the case where the puncturing region information is transmitted in the control channel of the next slot, and FIG. 5C shows a decoding procedure of the terminal at the HARQ retransmission timing in the case where the puncturing region indicator is transmitted in the control channel of the next slot.

Figure 6A:
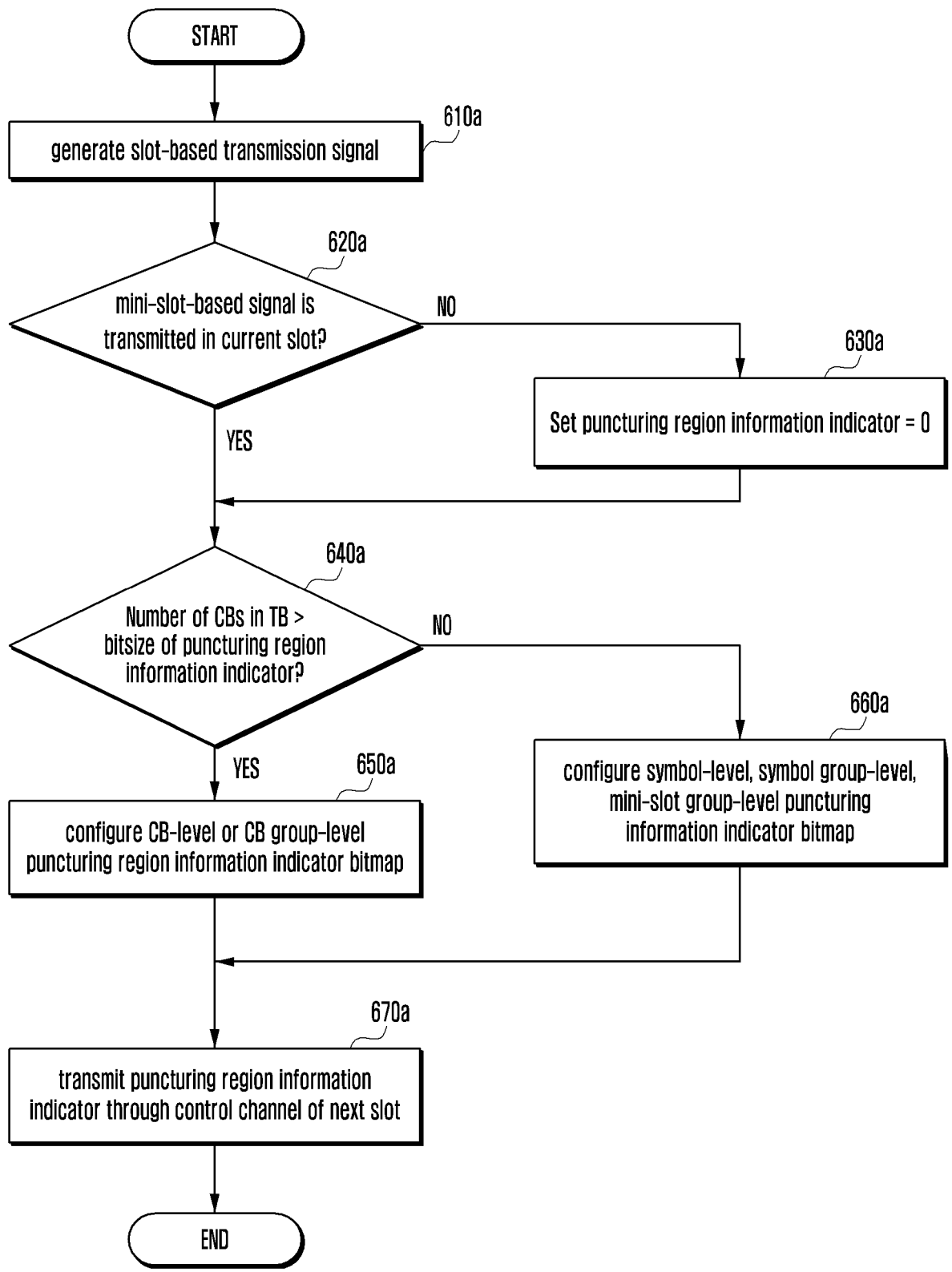
FIG. 6A is a flowchart illustrating an operation of a base station for transmitting a puncturing region indicator in the next slot in the case where mini-slot-based service data is transmitted in the current slot regardless of mini-slot-based data occurrence timing according to an embodiment of the disclosure.

FIG. 6A is a flowchart illustrating an operation of a base station for transmitting a puncturing region indicator in the next slot in the case where mini-slot-based service data is transmitted in the current slot regardless of mini-slot-based data occurrence timing according to an embodiment of the disclosure.

Referring to FIG. 6A, the base station generates a slot-based transmission signal operation 610a. The base station determines whether a mini-slot-based signal is transmitted in the current slot at operation 620a. If any mini-slot-based signal is not transmitted in the current slot, a puncturing region information indicator is set to 0 at operation 630a. The base station determines whether the number of CBs in TB is greater than the bit size of a puncturing region information indicator at operation 640a. If the number of CBs in TB is greater than the bit size of the puncturing region information indicator, the base station configures a CB-level or CB group-level puncturing region information indicator bitmap at operation 650a. Otherwise, the base station configures a symbol-level, symbol group-level, or mini-slot group-level puncturing information indicator bitmap at operation 660a. The base station transmits a puncturing region information indicator through the control channel of the next slot 670.

This approach is advantageous in terms of reduction of terminal implementation complexity because there is no need for the terminal to determine whether the puncturing region indicator is transmitted in the current or next slot.

Figure 6B:
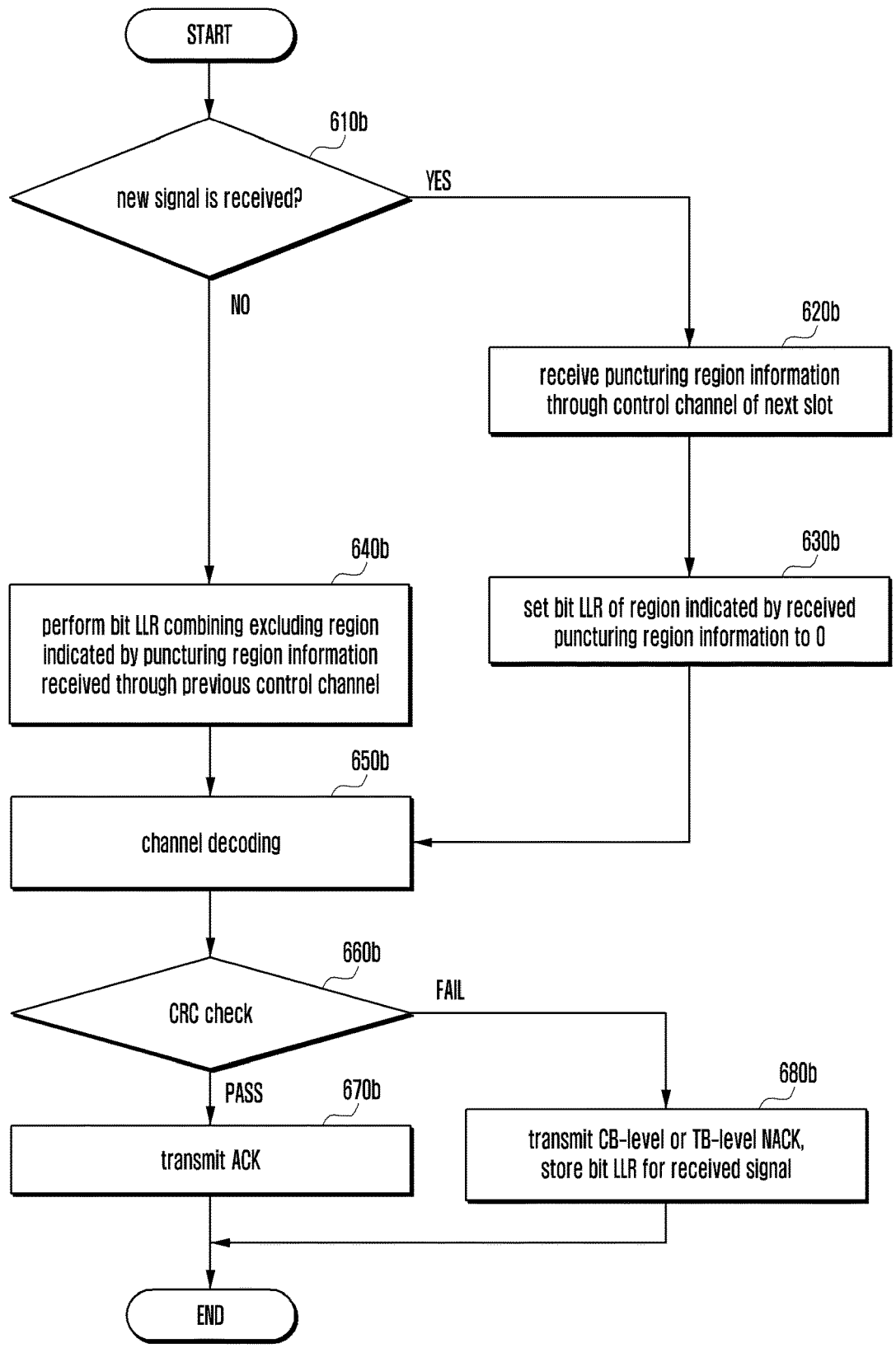
FIGS. 6B and 6C are flowcharts illustrating operations of a terminal according to various embodiments of the disclosure.
Figure 6C:
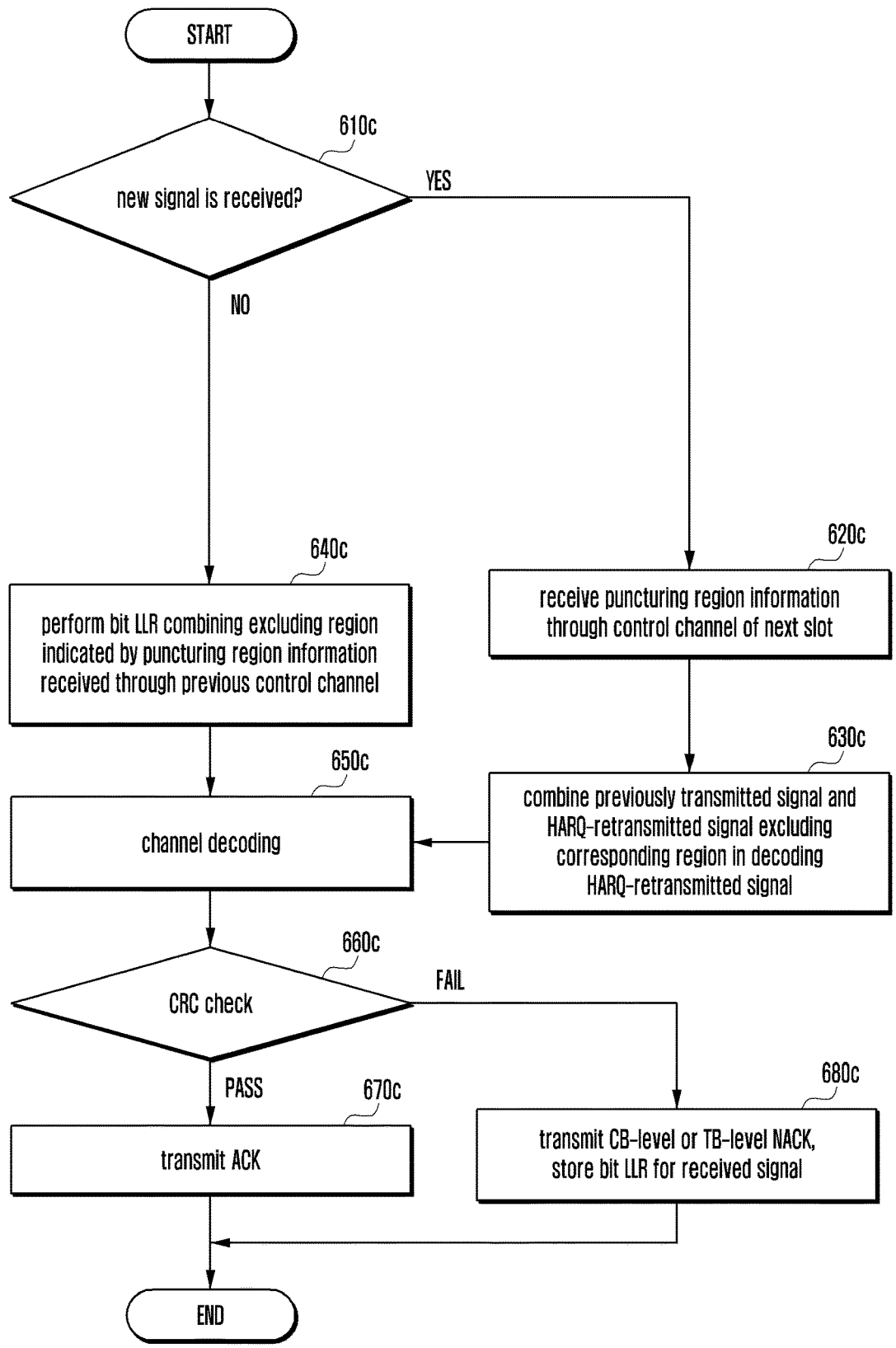

FIGS. 6B and 6C are flowcharts illustrating operations of a terminal according to various embodiments of the disclosure.

FIG. 6B is a flowchart illustrating a decoding procedure in a current slot based on a puncturing region indicator being transmitted in the control channel of the next slot, and FIG. 6C is a flowchart illustrating a decoding procedure at a HARQ retransmission timing based on the puncturing region indicator being transmitted in the control channel of the next slot.

Referring to FIG. 6B, the terminal determines whether a new signal is received at operation 610b. When the new signal is received, the terminal receives puncturing region information through the control channel of the next slot at operation 620b, and sets bit LLR of the region indicated by the received puncturing region information to 0 at operation 630b. If the new signal is not received, e.g., the HARQ-retransmitted signal is received, the terminal performs bit LLR combining excluding the region indicated by puncturing region information received through the previous control channel 640b. The terminal performs a channel decoding at operation 650b and a CRC check at operation 660b. The terminal transmits ACK at operation 670b, or transmits CB-level or TB-level NACK at operation 680b according to the result of the CRC check. In addition, if the terminal fails in the CRC check, the terminal stores bit LLR for the received signal at operation 680b.

Referring to FIG. 6C, the terminal determines whether a new signal is received at operation 610c. When the new signal is received, the terminal receives puncturing region information through the control channel of the next slot at operation 620c, and combines the previously transmitted signal and the HARQ-retransmitted signal excluding corresponding region in decoding HARQ-retransmitted signal at operation 630c. If the new signal is not received, e.g., the HARQ-retransmitted signal is received, the terminal performs bit LLR combining excluding the region indicated by puncturing region information received through the previous control channel 640c. The terminal performs a channel decoding at operation 650c and a CRC check at operation 660c. The terminal transmits ACK at operation 670c, or transmits CB-level or TB-level NACK at operation 680c according to the result of the CRC check. In addition, if the terminal fails in the CRC check, the terminal stores bit LLR for the received signal at operation 680c.

The above descriptions have been directed to the methods for configuring the puncturing region indicator being transmitted at the control channel timings 1) and 2) among the three control channel timings.

Hereinafter, a description is made of the method for configuring the puncturing region indicator in the control channel being transmitted at the control channel timing 3) among the three control channel timings. As shown in FIG. 2, the control channel timing 3) is the case where the base station transmits the puncturing region indicator through the control channel at an HARQ retransmission timing after the terminal has transmitted an HARQ-ACK feedback to the base station. In this case, the terminal transmits to the base station CB-level ACK/NACK corresponding to the previously transmitted data, and the base station retransmits the CB(s) that has (have) been negatively-acknowledged (NACK'ed). In this case, it is necessary to configure the puncturing region indicator to cover only the CB(s) NACK'ed by the terminal.

Figure 7:
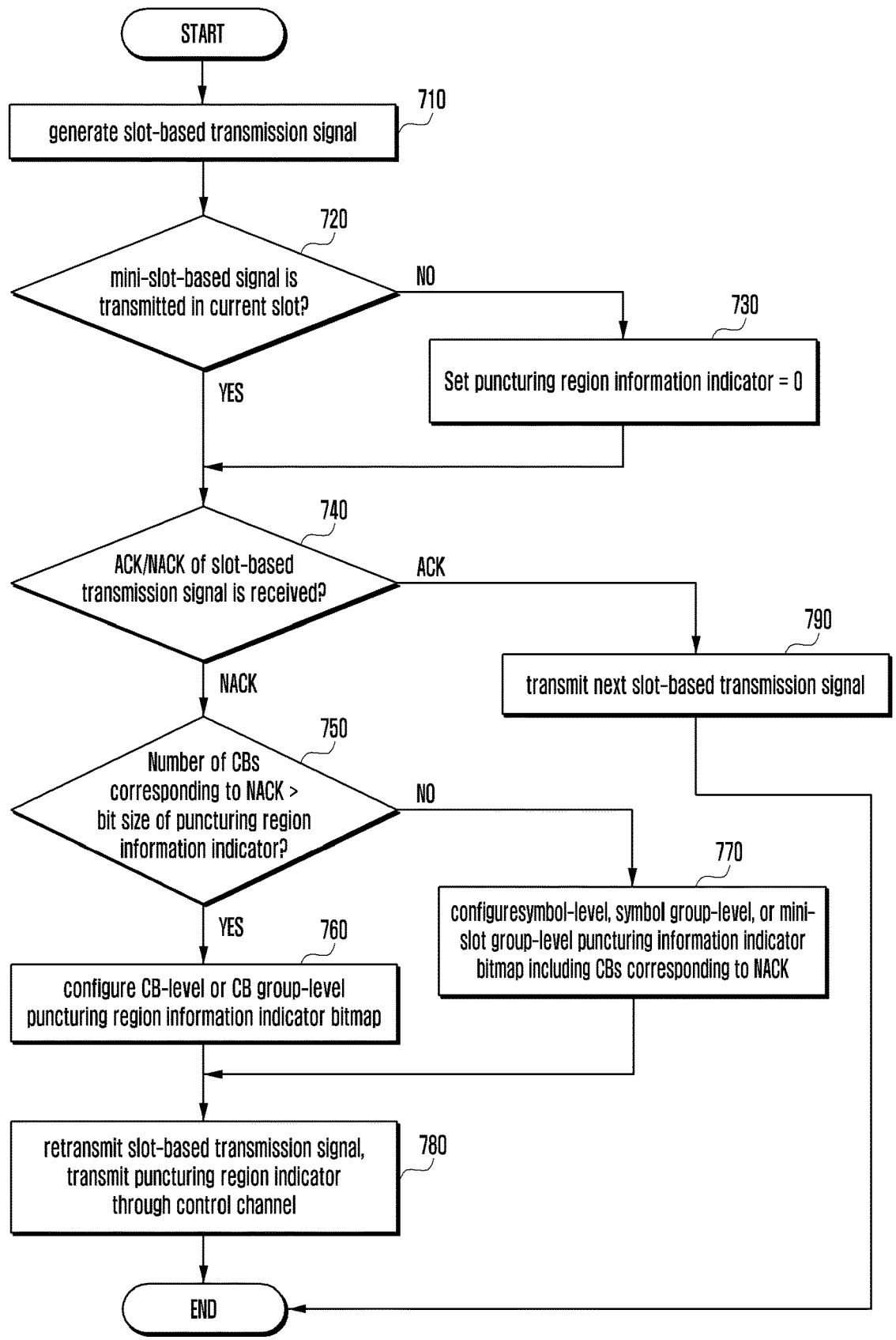
FIGS. 7 and 8 are flowcharts illustrating operations of a terminal and a base station in the case of transmitting a puncturing region indicator at the control channel timing 3) according to various embodiments of the disclosure.
Figure 8:
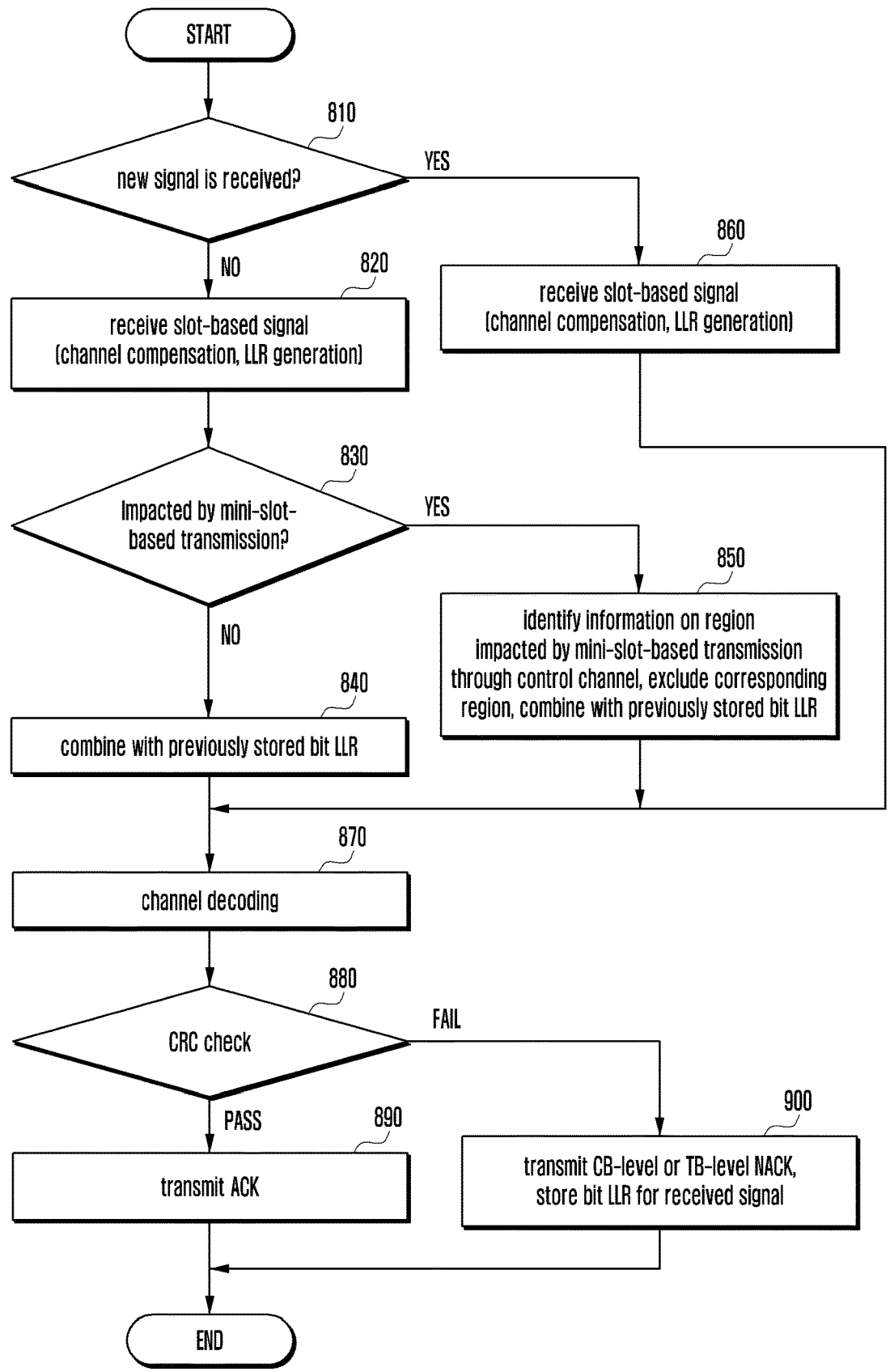

FIGS. 7 and 8 are flowcharts illustrating operations of a terminal and a base station in the case of transmitting a puncturing region indicator at the control channel timing 3) according to various embodiments of the disclosure.

Referring to FIG. 7, the base station generates a slot-based transmission signal operation 710. The base station determines whether a mini-slot-based signal is transmitted in the current slot at operation 720. If any mini-slot-based signal is not transmitted in the current slot, a puncturing region information indicator is set to 0 at operation 730. The base station determines whether ACK/NACK of slot-based transmission signal is received at operation 740. If NACK is received, the base station determines whether the number of CBs corresponding to NACK is greater than the bit size of puncturing region information indicator at operation 750. If the number of CBs corresponding to NACK is greater than the bit size of puncturing region information indicator, the base station configures symbol-level, symbol group-level, or mini-slot group-level puncturing information indicator bitmap including CBs corresponding to NACK at operation 760. Otherwise, the base station configures CB-level or CB group-level puncturing region information indicator bitmap at operation 770. The base station retransmits slot-based transmission signal, transmit puncturing region indicator through control channel at operation 780. If ACK is received at operation 740, the base station transmits next slot-based transmission signal at operation 790.

Referring to FIG. 8, the terminal determines whether a new signal is received at operation 810. If the new signal is not received, e.g., the HARQ-retransmitted signal is received, the terminal receives a slot-based signal (channel compensation, LLR generation) at operation 820, and determines whether the terminal is impacted by mini-slot-based transmission at operation 830. If there is no impact by mini-slot-based transmission, the terminal combines with previously stored bit LLR at operation 840, whereas if the terminal is impacted by mini-slot-based transmission, the terminal identifies information on region impacted by mini-slot-based transmission through control channel, excludes corresponding region, and combines with previously stored bit LLR at operation 850. If the new signal is received, the terminal receives slot-based signal (channel compensation, LLR generation) at operation 860. The terminal performs a channel decoding at operation 870 and a CRC check at operation 880. The terminal transmits ACK at operation 890, or transmits CB-level or TB-level NACK at operation 900 according to the result of the CRC check. In addition, if the terminal fails in the CRC check, the terminal stores bit LLR for the received signal at operation 900.

In this case, the puncturing region indicator may be configured as follows. First, a number of CBs that have been negatively acknowledged by the terminal is defined.

Number of CBs NACK'ed by terminal=K"

Here, it is assumed that the indices of the NACK'ed CBs are mapped to logical indices regardless of the original CB indices. For example, if the CBs 2, 5, and 6 are NACK'ed, the CB indices 2, 5, and 6 are mapped to logical indices 1, 2, and 3. Hereinafter, the description is made with the logical indices corresponding to the indices of the NACK'ed CBs. Then, it is possible to configure the puncturing region indicator with a bitwidth of 4 bits representing NACK'ed CBs.

If $-N<=K"$,

Small size of CB group (CBGs)=floor(K/N)

Large size of CB group (CBGb)=ceil(K/N)

If CBGb=CBGs,

CB index corresponding to $i^{th}$ bit of puncturing region indicator=(i−1)·CBGs+1:i·CBGs If CBGb>CBGs, Option 3-1)=replace K with K" in Option1-1)

Option 3-2)=replace K with K" in Option1-2)

If $-N>K"$,

Number of symbols (or mini-slots) constituting NACK'ed CBs=K'''

Here, it is assumed that the indices of the symbols (or mini-slots) constituting the NACK'ed CBs are mapped to logical indices regardless of the original symbol (or mini-slot) indices. For example, if the symbols (or mini-slots) 2, 4, and 6 constitute the NACK'ed CBs, the symbol (or mini-slot) indices 2, 4, and 6 are mapped to logical indices 1, 2, and 3. Hereinafter, the description is made with the logical indices as a replacement of the symbols (or mini-slot indices) constituting the NACK'ed CBs.

If K'''>K", (if K'''<N, only K''' bits are used among N bits, and value N is replaced by value K''' hereinbelow. The remaining bits N−K''' are reserved for use of indicating PRB-level granularity.)

Small size of symbol (or mini-slot) group (SGs)=floor(K'''/N)

Large size of symbol (or mini-slot) group (SGb)=ceil(K'''/N)

If SGb=SGs,

Symbol (or mini-slot) index corresponding to $i^{th}$ bit of puncturing region indicator=(i−1)·SGs+1:i·SGs If SGb>SGs, Option 3-1)=replace K with K''' in Option1-1)

Option 3-2)=replace K with K''' in Option1-2)

If K'''<=K", it may be possible to use K" bits among N bits and reserve the remaining bits N−K" for use by indicating PRB-level granularity.

CB index corresponding to $i^{th}$ bit of puncturing region indicator=i

In the above description, the method for configuring a puncturing region indicator according to the puncturing region indicator transmission timing that falls in one of three control channel timings 1), 2), and 3) has been proposed. The puncturing region indicator has been configured in a terminal-specific (user equipment (UE)-specific) manner.

Figure 9:
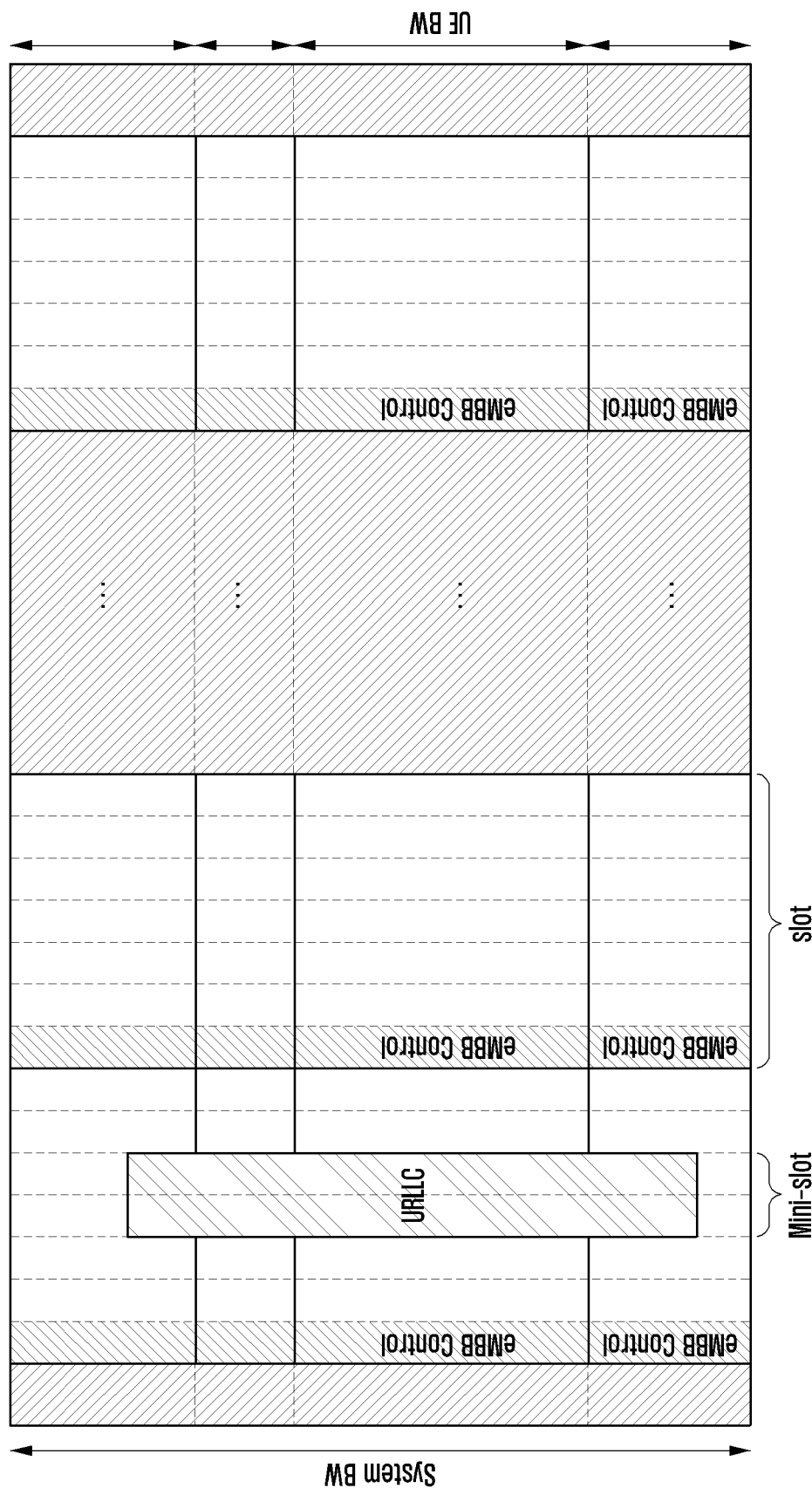
FIG. 9 is a diagram according to an embodiment of the disclosure.

FIG. 9 is a diagram according to an embodiment of the disclosure.

Hereinafter, a description is made of the method for configuring a terminal-group common (UE-group common) indicator. Referring to FIG. 9, a system bandwidth may be divided into terminal bandwidths (UE bandwidths), and the resources of one terminal bandwidth may be allocated to the terminals supporting the corresponding bandwidth. If mini-slot-based service data occur at the terminals receiving slot-based service data, some of the mini-slot-based services (e.g., URLLC) may occupy a broad bandwidth by their nature and, in this case, the terminals receiving the slot-based services may experience puncturing simultaneously. If multiple terminals experience puncturing as above, it may be possible to reduce puncturing region indicator transmission overhead by transmitting a terminal-group common indicator as a puncturing region indicator. In this case, it is preferable to use a symbol group-level puncturing region indicator rather than a CB-level puncturing region indicator, unlike the case of using the terminal-specific puncturing region indicator. The terminal-group common indicator may be transmitted through a slot-based terminal-group common control channel (UE-group common physical downlink control channel (PDCCH)) of the slot in which puncturing occurs or a slot-based terminal group common control channel (UE-group common PDCCH) of the next slot. The transmission timing of the terminal-group common indicator is determined according to the mini-slot service data occurrence timing based on the same principle as described with the control channel timings 1) and 2).

As described above, because only the symbol-level puncturing region indicator can be used in the UE-group common control channel, it may be necessary to transmit an extra indicator through a UE-specific control channel at every HARQ retransmission timings per terminal to transmit addition information on the puncturing region. In this case the puncturing region indicator may be configured as a CB-level or CB group-level puncturing region indicator in the NACK'ed CB of the corresponding UE. The corresponding terminal may acquire the puncturing region information by combining the symbol information received through previous terminal-group common control channel and CB information received through a terminal-specific control channel.

Figure 10A:
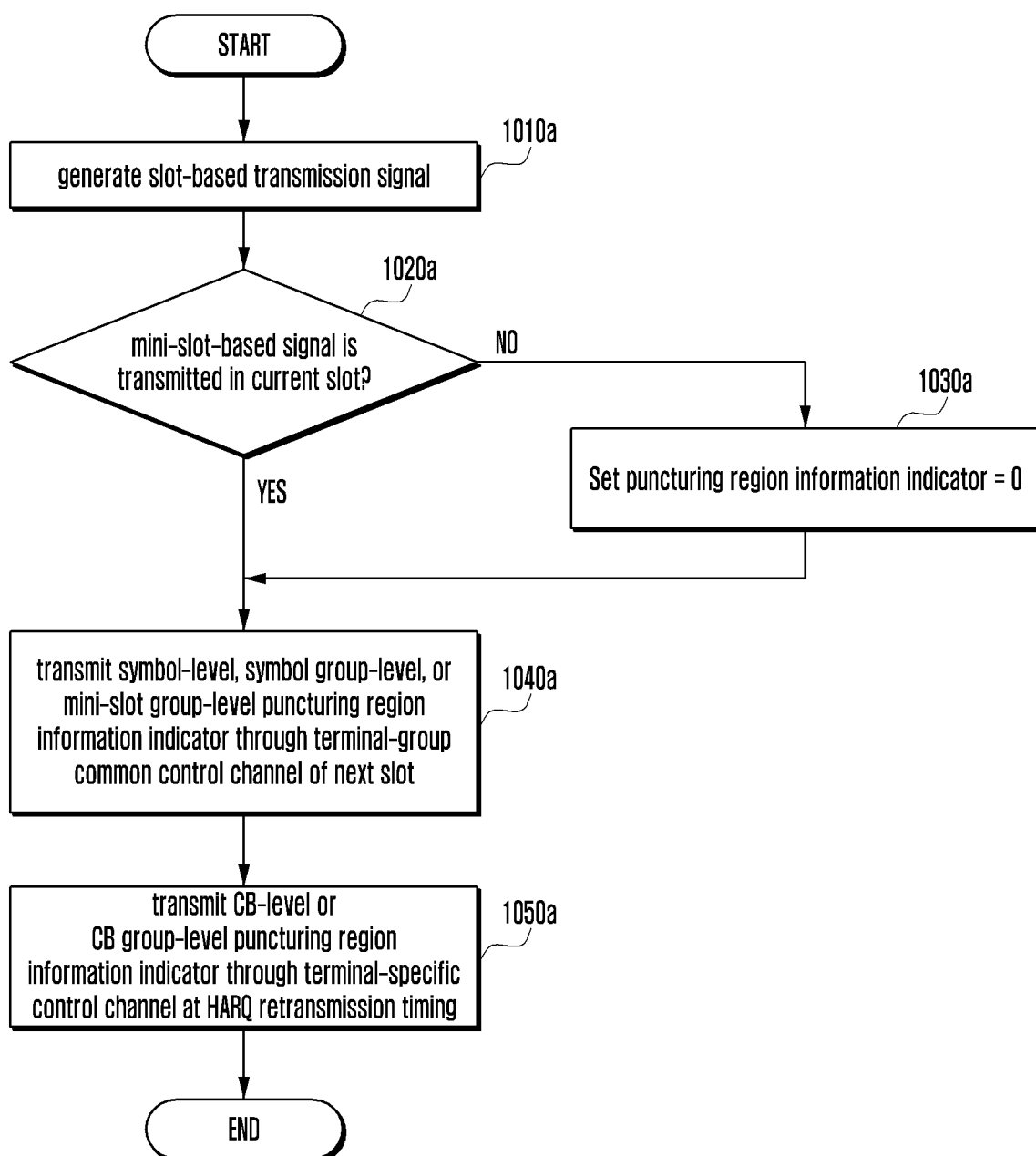
FIG. 10A is a flowchart illustrating an operation of a base station in the above situation according to an embodiment of the disclosure.

FIG. 10A is a flowchart illustrating an operation of a base station in the above situation according to an embodiment of the disclosure.

Referring to FIG. 10A, the base station generates a slot-based transmission signal at operation 1010a. The base station determines whether a mini-slot-based signal is transmitted in the current slot at operation 1020a. If any mini-slot-based signal is not transmitted in the current slot, a puncturing region information indicator is set to 0 at operation 1030a. The base station transmits a symbol-level, symbol group-level, or mini-slot group-level puncturing region information indicator through a terminal-group common control channel of the next slot at operation 1040a, and transmits a CB-level or CB group-level puncturing region information indicator through a terminal-specific control channel at the HARQ retransmission timing at operation 1050a.

Figure 10B:
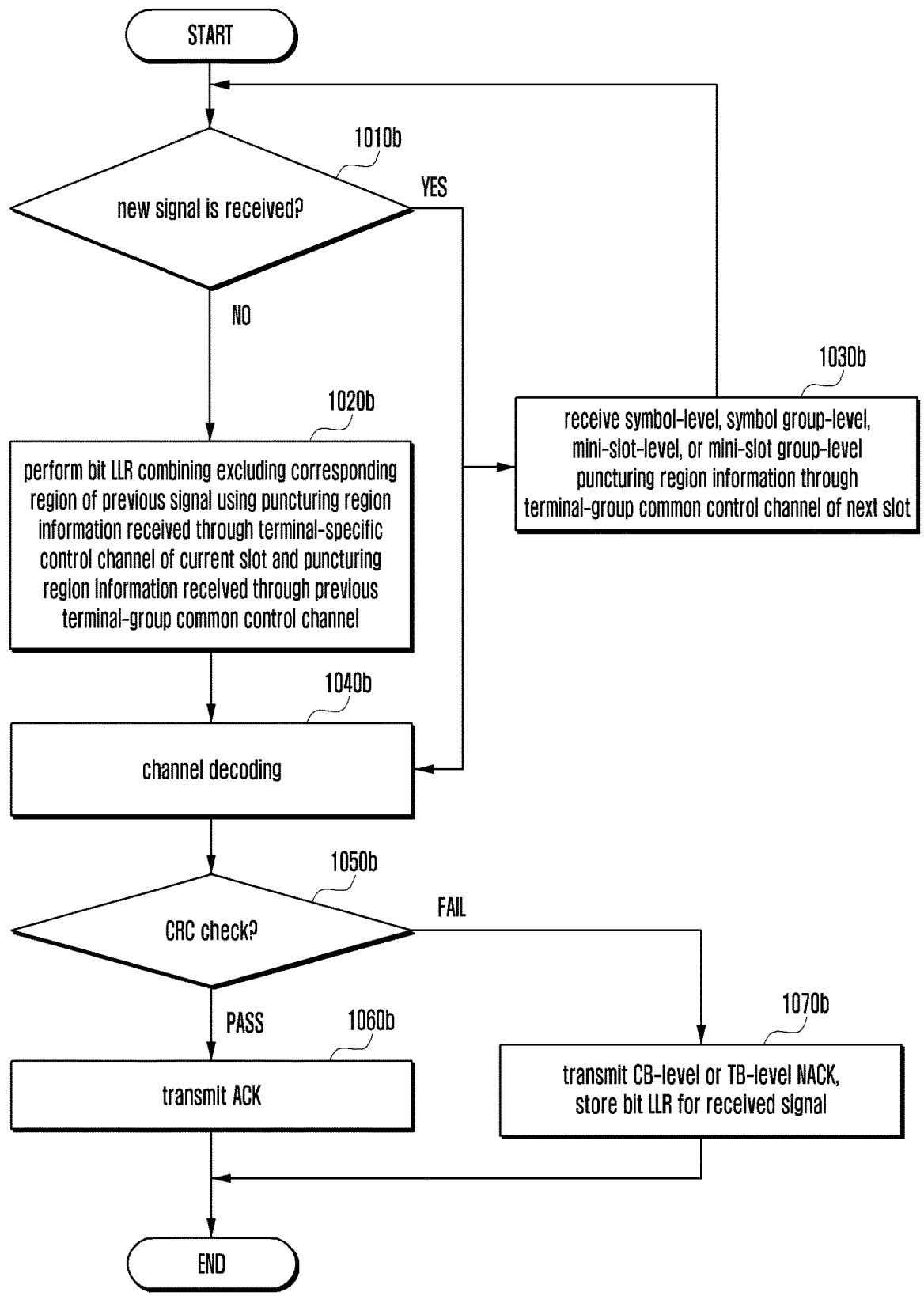
FIG. 10B is a flowchart illustrating an operation of a terminal in the above situation according to an embodiment of the disclosure.

FIG. 10B is a flowchart illustrating an operation of a terminal in the above situation according to an embodiment of the disclosure.

Referring to FIG. 10B, the terminal determines whether a new signal is received at operation 1010b. If the new signal is not received, e.g., the HARQ-retransmitted signal is received, the terminal performs bit LLR combining excluding corresponding region of the previous signal using the puncturing region information received through terminal-specific control channel of current slot and the puncturing region information received through previous terminal-group common control channel at operation 1020b. If the new signal is received, the terminal receives symbol-level, symbol group-level, mini-slot-level, or mini-slot group-level puncturing region information through terminal-group common control channel of next slot at operation 1030b. The terminal performs a channel decoding at operation 1040b and a CRC check at operation 1050b. The terminal transmits ACK at operation 1060b, or transmits CB-level or TB-level NACK at operation 1070b according to the result of the CRC check. In addition, if the terminal fails in the CRC check, the terminal stores bit LLR for the received signal at operation 1070b.

Figure 11:
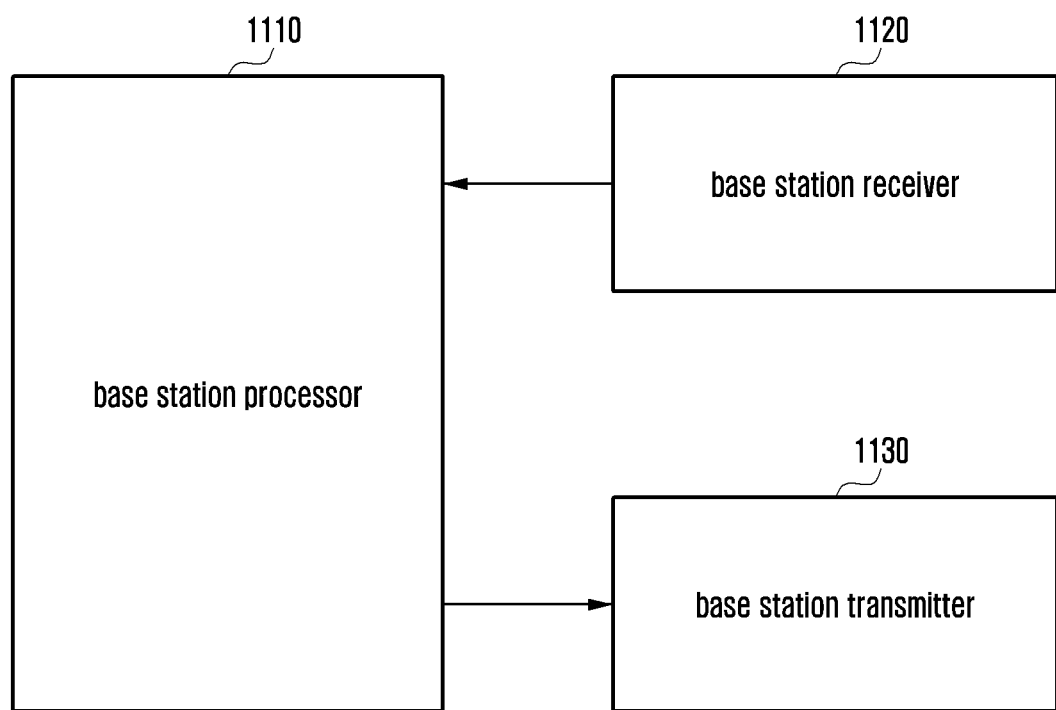
FIG. 11 is a block diagram of a base station according to an embodiment of the disclosure.

FIG. 11 is a block diagram of a base station according to an embodiment of the disclosure.

Referring to FIG. 11, a base station includes a base station processor (1110), a base station receiver (1120) and a base station transmitter (1130). The base station processor (1110) may refer to a controller, a circuitry, ASIC, or at least one processor configured to perform the operations of the UE illustrated in the figures, e.g. FIGS. 1A to 10B, or described above. The base station receiver (1120) and the base station transmitter (1130) are functionally coupled with the base station processor (1110) to allow the base station to communicate with other entity such as a terminal.

Figure 12:
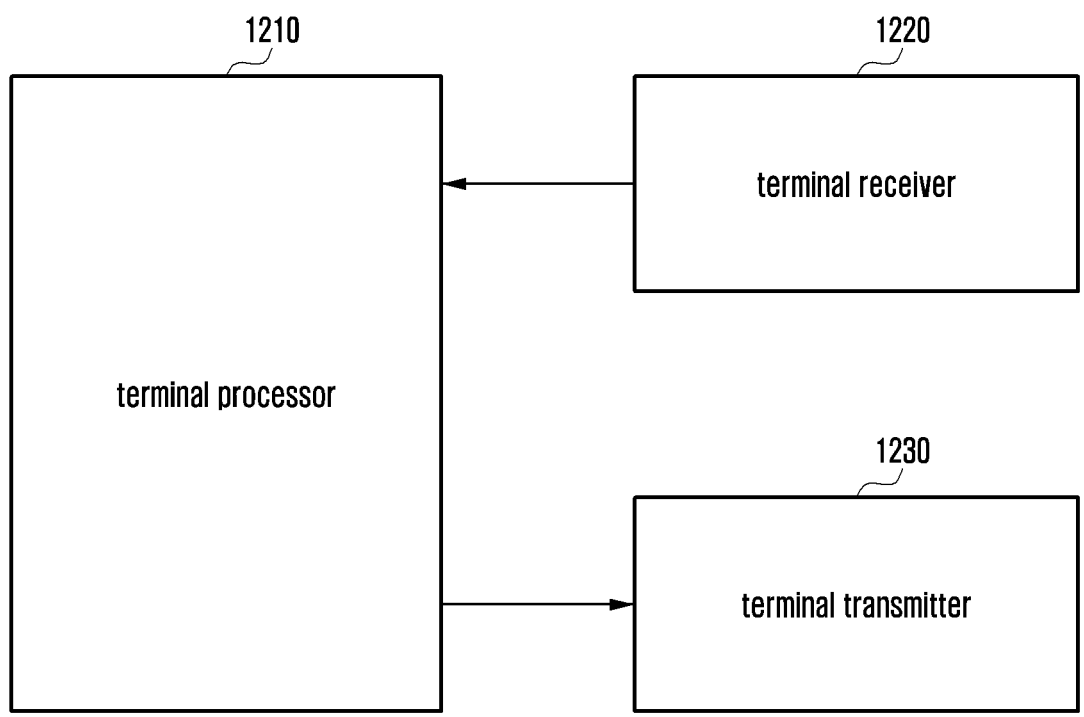
FIG. 12 is a block diagram of a terminal according to an embodiment of the disclosure.

FIG. 12 is a block diagram of a terminal according to an embodiment of the disclosure.

Referring to FIG. 12, a terminal includes a terminal processor (1210), a terminal receiver (1220) and a terminal transmitter (1230). The terminal processor (1210) may refer to a controller, a circuitry, an ASIC, or at least one processor configured to perform the operations of a base station (e.g. gNB, eNB, network) illustrated in the figures, e.g. FIGS. 1A to 10B, or described above. The terminal receiver (1220) and the terminal transmitter (1230) are functionally coupled with the terminal processor (1210) to allow the terminal to communicate with other entity such as a base station.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a base station in a wireless communication system, the method comprising:
    transmitting, to a terminal, data on a plurality of symbols; and
    transmitting, to the terminal, a bitmap associated with the transmitted data,
    wherein each bit of the bitmap indicates whether data intended for the terminal has been punctured for a corresponding symbol group among the plurality of the symbols,
    wherein a size of the bitmap is fixed, and
    wherein the bitmap includes a first bit corresponding to a first symbol group and a second bit corresponding to a second symbol group, and the first symbol group includes one more symbol than the second symbol group.

2. The method of claim 1,
    wherein the bitmap is mapped with symbol groups of consecutive symbols from the plurality of the symbols, and
    wherein a number of the symbol groups correspond to the size of the bitmap.

3. The method of claim 1, further comprising:
    receiving, from the terminal, a hybrid automatic repeat request acknowledge/negative acknowledge (HARQ ACK/NACK) associated with the transmitted data based on the bitmap.

4. A method performed by a terminal in a wireless communication system, the method comprising:
  receiving, from a base station, data on a plurality of symbols;
  receiving, from the base station, a bitmap associated with the received data, wherein each bit of the bitmap indicates whether data intended for the terminal has been punctured in a corresponding symbol group among the plurality of the symbols, each symbol group including at least one symbol; and
  identifying that the data intended for the terminal has been punctured in at least one symbol group among the plurality of the symbols based on the bitmap,
  wherein a size of the bitmap is fixed, and
  wherein the bitmap includes a first bit corresponding to a first symbol group and a second bit corresponding to a second symbol group and the first symbol group includes one more symbol than the second symbol group.

5. The method of claim 4,
  wherein the bitmap is mapped with symbol groups of consecutive symbols from the plurality of the symbols, and
  wherein a number of the symbol groups correspond to the size of the bitmap.

6. The method of claim 4, further comprising:
  transmitting, to the base station, a hybrid automatic repeat request acknowledge/negative acknowledge (HARQ ACK/NACK) associated with the received data based on the bitmap.

7. A base station in a wireless communication system, the base station comprising:
  a transceiver; and
  at least one processor configured to:
    transmit, to a terminal via the transceiver, data on a plurality of symbols, and
    transmit, to the terminal via the transceiver, a bitmap associated with the transmitted data,
  wherein each bit of the bitmap indicates whether data intended for the terminal has been punctured for a corresponding symbol group among the plurality of the symbols,
  wherein a size of the bitmap is fixed, and
  wherein the bitmap includes a first bit corresponding to a first symbol group and a second bit corresponding to a second symbol group, and the first symbol group includes one more symbol than the second symbol group.

8. The base station of claim 7,
  wherein the bitmap is mapped with symbol groups of consecutive symbols from the plurality of the symbols, and
  wherein a number of the symbol groups correspond to the size of the bitmap.

9. The base station of claim 7, wherein the at least one processor is further configured to receive, from the terminal via the transceiver, a hybrid automatic repeat request acknowledge/negative acknowledge (HARQ ACK/NACK) associated with the transmitted data based on the bitmap.

10. A terminal in a wireless communication system, the terminal comprising:
  a transceiver; and
  at least one processor configured to:
    receive, from a base station via the transceiver, data on a plurality of symbols,
    receive, from the base station via the transceiver, a bitmap associated with the received data, wherein each bit of the bitmap indicates whether data intended for the terminal has been punctured in a corresponding symbol group among the plurality of the symbols, each symbol group including at least one symbol, and
    identify that the data intended for the terminal has been punctured in at least one symbol group among the plurality of the symbols based on the bitmap,
  wherein a size of the bitmap is fixed, and
  wherein the bitmap includes a first bit corresponding to a first symbol group and a second bit corresponding to a second symbol group and the first symbol group includes one more symbol than the second symbol group.

11. The terminal of claim 10,
  wherein the bitmap is mapped with symbol groups of consecutive symbols from the plurality of the symbols, and
  wherein a number of the symbol groups correspond to the size of the bitmap.

12. The terminal of claim 10, wherein the at least one processor is further configured to transmit, to the base station via the transceiver, a hybrid automatic repeat request acknowledge/negative acknowledge (HARQ ACK/NACK) associated with the received data based on the bitmap.

* * * * *